US012739705B2

(12) United States Patent
Otani et al.

(10) Patent No.: US 12,739,705 B2
(45) Date of Patent: Sep. 15, 2026

(54) WIRELESS APPARATUS AND WIRELESS COMMUNICATION METHOD

(71) Applicant: NTT, Inc., Tokyo (JP)

(72) Inventors: Hanae Otani, Musashino (JP); Kengo Nagata, Musashino (JP); Akira Kishida, Musashino (JP); Shoko Shinohara, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 292 days.

(21) Appl. No.: 18/684,188

(22) PCT Filed: Aug. 18, 2021

(86) PCT No.: PCT/JP2021/030178

§ 371 (c)(1),
(2) Date: Feb. 16, 2024

(87) PCT Pub. No.: WO2023/021610

PCT Pub. Date: Feb. 23, 2023

(65) Prior Publication Data

US 2024/0430750 A1 Dec. 26, 2024

(51) Int. Cl.

*H04W 28/20* (2009.01)
*H04W 72/0453* (2023.01)
*H04W 72/56* (2023.01)

(52) U.S. Cl.

CPC ....... *H04W 28/20* (2013.01); *H04W 72/0453* (2013.01); *H04W 72/56* (2023.01)

(58) Field of Classification Search

CPC .. H04W 28/20; H04W 72/56; H04W 72/0453
See application file for complete search history.

(56) References Cited

U.S. PATENT DOCUMENTS

2015/0358904 A1 12/2015 Kwon et al.
2019/0200375 A1* 6/2019 Yasukawa ............. H04W 72/56

OTHER PUBLICATIONS

IEEE P802.11ax™/D8.0, "26.10 Spatial reuse operation", Draft Standard for Information technology—Telecommunications and information exchange between systems Local and metropolitan area networks •Specific requirements, Part 11: Wireless LAN Medium Access Control (MAC) and Physical Layer (PHY) Specifications, Amendment 1: Enhancements for High Efficiency WLAN, Prepared by the 802.11 Working Group of the LAN/MAN Standards Committee of the IEEE Computer Society, Oct. 2020, 15 pages.

(Continued)

*Primary Examiner* — Won Tae C Kim
(74) *Attorney, Agent, or Firm* — XSENSUS LLP

(57) ABSTRACT

A wireless apparatus according to an aspect of the present invention includes a threshold determination unit that determines a threshold used for determining a usage state of a frequency channel, the threshold determination unit setting the threshold to a first value when a first priority that is a priority of a frame to be transmitted is a first priority level and setting the threshold to a second value higher than the first value when the first priority is a second priority level higher than the first priority level, and a carrier sense control unit that determines the usage state of the frequency channel based on a comparison between reception power of a frame detected on the frequency channel by carrier sense and the threshold.

10 Claims, 22 Drawing Sheets

(56) References Cited

OTHER PUBLICATIONS

Notification of Transmittal of Translation of the International Preliminary Report on Patentability mailed Feb. 29, 2024, in International Application No. PCT/JP2021/030178, 6 pages.

* cited by examiner

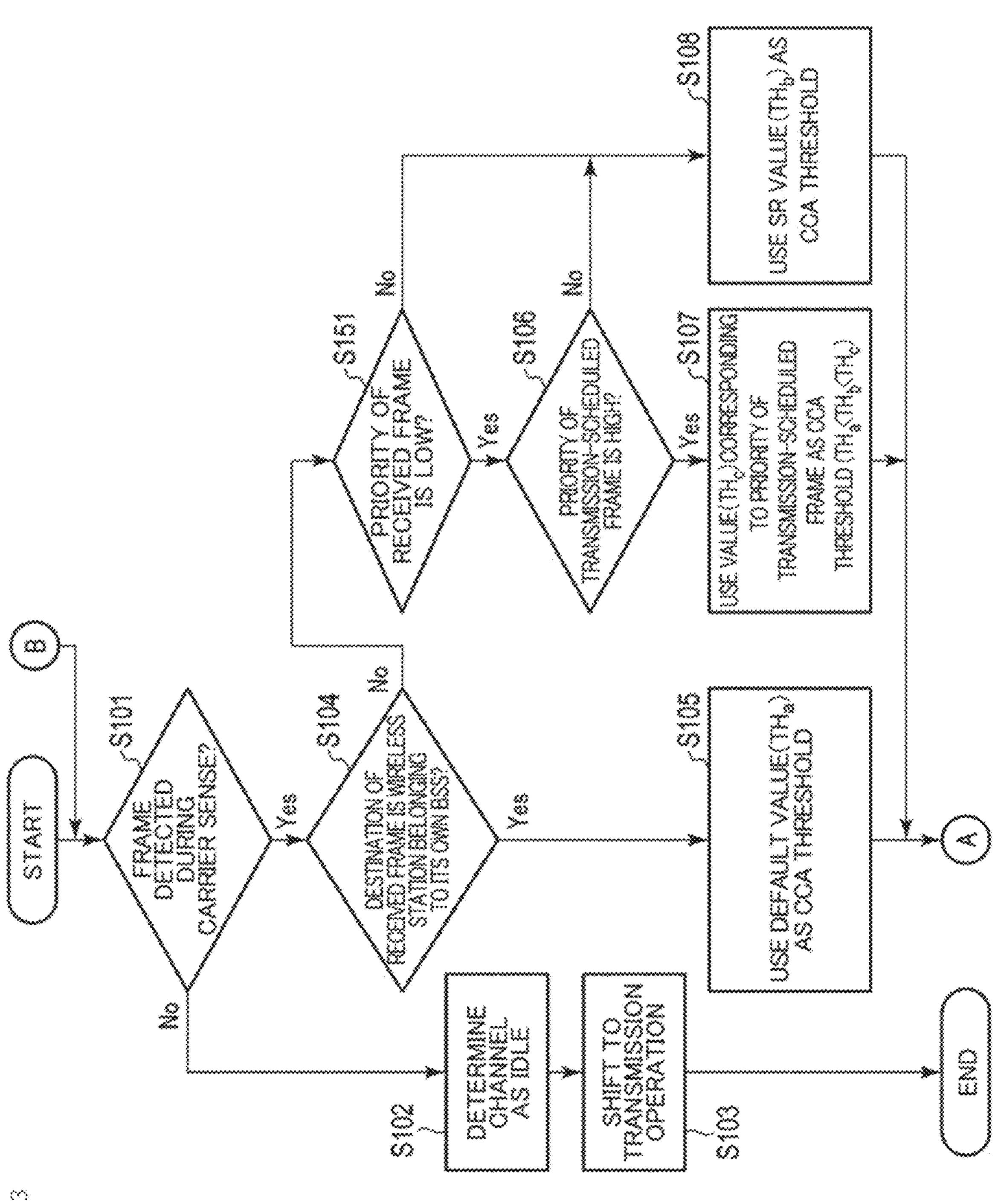

Fig. 13
START
B
FRAME DETECTED DURING CARRIER SENSE?
S101
Yes
No
DESTINATION OF RECEIVED FRAME IS WIRELESS STATION BELONGING TO ITS OWN BSS?
S104
Yes
No
PRIORITY OF RECEIVED FRAME IS LOW?
S151
Yes
No
PRIORITY OF TRANSMISSION-SCHEDULED FRAME IS HIGH?
S106
Yes
No
USE VALUE ($TH_c$) CORRESPONDING TO PRIORITY OF TRANSMISSION-SCHEDULED FRAME AS CCA THRESHOLD ($TH_a<TH_c<TH_b$)
S107
USE SR VALUE ($TH_b$) AS CCA THRESHOLD
S108
USE DEFAULT VALUE ($TH_a$) AS CCA THRESHOLD
S105
A
DETERMINE CHANNEL AS IDLE
S102
SHIFT TO TRANSMISSION OPERATION
S103
END

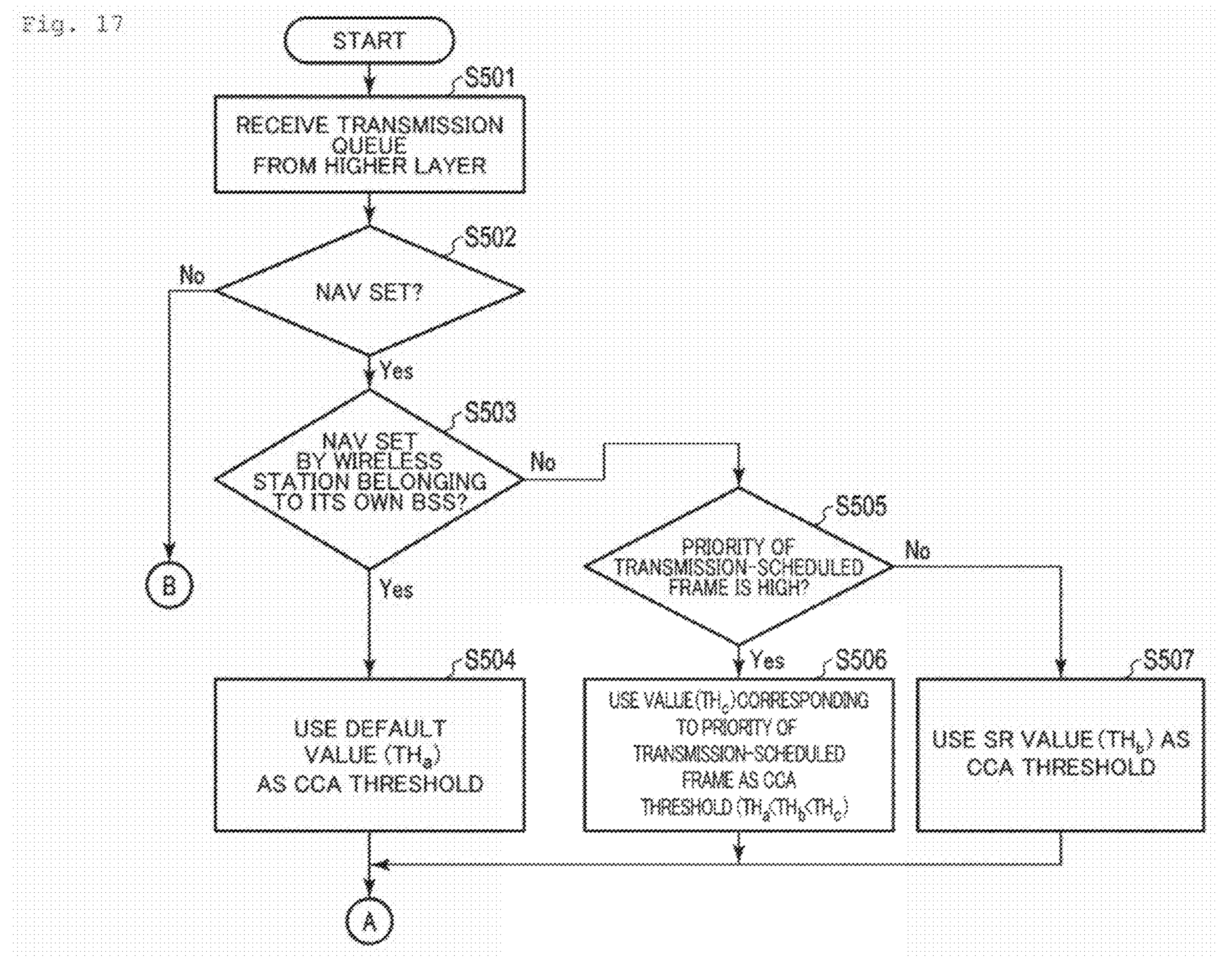
Fig. 17
START
S501
RECEIVE TRANSMISSION QUEUE FROM HIGHER LAYER
S502
NAV SET?
No
B
Yes
S503
NAV SET BY WIRELESS STATION BELONGING TO ITS OWN BSS?
Yes
S504
USE DEFAULT VALUE ($TH_a$) AS CCA THRESHOLD
No
S505
PRIORITY OF TRANSMISSION-SCHEDULED FRAME IS HIGH?
Yes
S506
USE VALUE ($TH_c$) CORRESPONDING TO PRIORITY OF TRANSMISSION-SCHEDULED FRAME AS CCA THRESHOLD ($TH_a$<$TH_b$<$TH_c$)
No
S507
USE SR VALUE ($TH_b$) AS CCA THRESHOLD
A

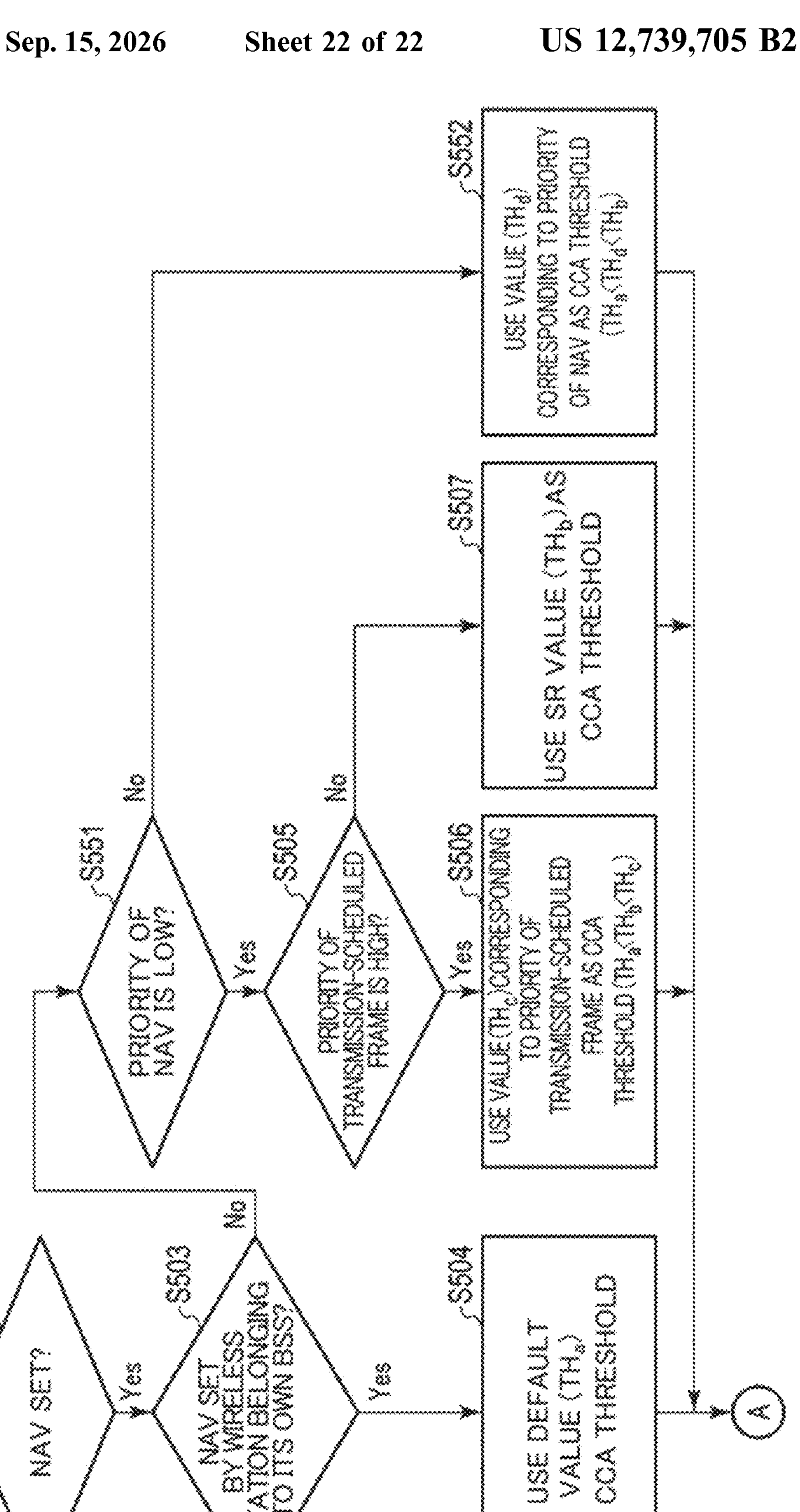

Fig. 21
START
S501
RECEIVE TRANSMISSION QUEUE FROM HIGHER LAYER
S502
NAV SET?
Yes
No
B
S503
NAV SET BY WIRELESS STATION BELONGING TO ITS OWN BSS?
Yes
No
S504
USE DEFAULT VALUE ($TH_a$) AS CCA THRESHOLD
A
S551
PRIORITY OF NAV IS LOW?
Yes
No
S505
PRIORITY OF TRANSMISSION-SCHEDULED FRAME IS HIGH?
Yes
No
S506
USE VALUE ($TH_c$) CORRESPONDING TO PRIORITY OF TRANSMISSION-SCHEDULED FRAME AS CCA THRESHOLD ($TH_a$<$TH_b$<$TH_c$)
S507
USE SR VALUE ($TH_b$) AS CCA THRESHOLD
S552
USE VALUE ($TH_d$) CORRESPONDING TO PRIORITY OF NAV AS CCA THRESHOLD ($TH_a$<$TH_d$<$TH_b$)

WIRELESS APPARATUS AND WIRELESS COMMUNICATION METHOD

CROSS-REFERENCE TO RELATED APPLICATION

This application is a national stage application, pursuant to 35 U.S.C. § 371, of International Patent Application No. PCT/JP2021/030178, filed Aug. 18, 2021, the entire contents of which are incorporated herein by reference.

TECHNICAL FIELD

The present invention relates to wireless communication.

BACKGROUND ART

In recent years, with the spread of portable high-performance wireless terminals such as laptop personal computers and smartphones, wireless local area networks (LANs) of the IEEE802.11 standard have been widely used not only in businesses and public spaces but also in ordinary households. As a result, situation in which a plurality of basic service sets (BSS) using the same frequency channel is adjacent to each other have arisen. In such a situation, there is a concern that the reliability of wireless communication will be degraded, such as a decrease in throughput and an increase in transmission latency.

CITATION LIST

Non-Patent Literature

Non Patent Literature 1: IEEE P802. 11ax/D8.0, "26.10 Spatial reuse operation," October 2020.

SUMMARY OF INVENTION

Technical Problem

An object of the present invention is to provide technology that enables highly reliable wireless communication.

Solution to Problem

A wireless apparatus according to an aspect of the present invention includes a threshold determination unit configured to determine a threshold used for determining a usage state of a frequency channel, the threshold determination unit setting the threshold to a first value when a first priority that is a priority of a frame to be transmitted is a first priority level and setting the threshold to a second value higher than the first value when the first priority is a second priority level higher than the first priority level, and a carrier sense control unit configured to determine the usage state of the frequency channel based on a comparison between reception power of a frame detected on the frequency channel by carrier sense and the threshold.

Advantageous Effects of Invention

According to the present invention, there is provided technology which enables highly reliable wireless communication.

BRIEF DESCRIPTION OF DRAWINGS

FIG. 13 is a flowchart showing another example of the operation of the access point shown in FIG. 5.

FIG. 17 is a flowchart showing still another example of the operation of the access point shown in FIG. 5.

FIG. 21 is a flowchart showing a further example of the operation of the access point shown in FIG. 5.

DESCRIPTION OF EMBODIMENTS

Hereinafter, embodiments of the present invention will be described with reference to the drawings.

First Embodiment

[Configuration]

Figure 1:
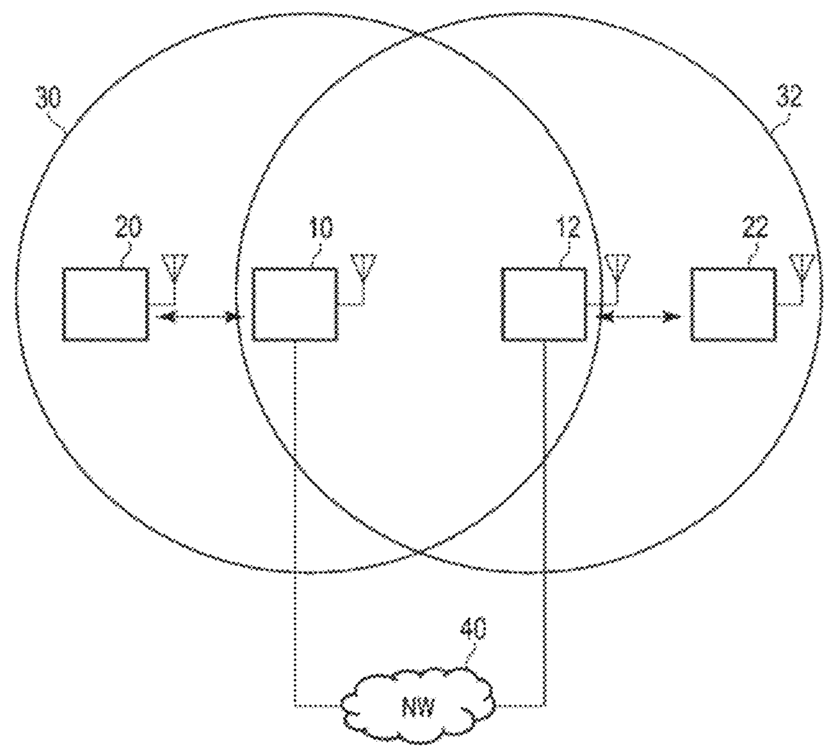
FIG. 1 is a diagram showing a communication system according to an embodiment of the present invention.

FIG. 1 schematically shows a communication system 50 according to a first embodiment of the present invention. As shown in FIG. 1, the communication system 50 includes access points 10 and 12, terminals 20 and 22, and a network 40.

The access points 10 and 12 operate as access points (APs) of a wireless local area network (LAN). The access point 10 wirelessly communicates with the terminal 20 and the access point 12 wirelessly communicates with the terminal 22. Communication between the access points 10 and 12 and the terminals 20 and 22 is based on, for example, the IEEE 802.11 standard. The access points 10 and 12 are connected to the network 40, for example, by wires. The network 40 may include a local area network (LAN), a wide area network (WAN), or both. Note that the access points 10 and 12 may be connected to separate networks.

The terminals 20 and 22 are wireless terminals. Examples of wireless terminals include smartphones, tablet personal computers (PC), desktop PCs, and laptop PCs. The terminals 20 and 22 exchange data with computers (for example, servers) on the network 40 that are not shown via the access points 10 and 12.

In the communication system 50, two basic service sets (BSSs) 30 and 32 exist adjacent to each other, the BSS 30 includes the access point 10 and the terminal 20, and the BSS 32 includes the access point 12 and the terminal 22. The BSSs 30 and 32 use the same frequency channel. Hereinafter, frequency channels are simply referred to as channels.

Hereinafter, the term "wireless station" is used as a generic term for access points and wireless terminals. For example, a wireless station may be each or any of the access points 10 and 12 and the terminals 20 and 22, depending on the context.

A wireless station performs carrier sense before frame transmission to determine the usage state of the channel used for frame transmission. Carrier sense may be based on the Carrier Sense Multiple Access with Collision Avoidance (CSMA/CA) algorithm. In CSMA/CA, a threshold called a Clear Channel Assessment (CCA) threshold is used to determine the usage state of the channel. When a wireless station detects a frame by carrier sense, the wireless station determines the CCA threshold based on the information included in the preamble of the detected frame and the priority of the frame to be transmitted (hereinafter sometimes referred to as a transmission-scheduled frame) and determines whether the channel is busy or idle based on a comparison between the reception power of the detected frame and the determined CCA threshold. The wireless station transmits a frame after confirming that the channel is idle.

The IEEE802.11ax amendment adds a spatial reuse (SR) operation and defines a BSS color. The SR operation makes it possible to identify the BSS to which a frame belongs by setting a different BSS color for each BSS. The BSS color is an identifier for BSS and is included in the preamble of a frame. Based on the BSS color included in the preamble of the detected frame, the wireless station can identify whether the destination of the detected frame is a wireless station within its own BSS (MyBSS) or a wireless station within another BSS (overlapping BSS (OBSS)). The wireless station increases the CCA threshold when the destination of a detected frame is a wireless station in another BSS. Specifically, the wireless station uses a CCA threshold of −82 dBm when the destination of the detected frame is a wireless station within its own BSS, and uses the CCA threshold determined in the SR operation when the destination of the detected frame is a wireless station within another BSS. The CCA threshold determined in the SR operation is called an SR value. In one example, a CCA threshold of −77 dBm may be used as the SR value. The IEEE802.11ax amendment addresses the exposed terminal problem by determining the CCA threshold based on whether the destination of a frame is a wireless station within its own BSS or another BSS.

In FIG. 1, it is assumed that the access points 10 and 12 and the terminals 20 and 22 are positioned such that the access point 12 can detect a signal from the access point 10 with power exceeding the CCA threshold determined by the SR operation, the terminal 20 cannot detect the signal from the terminal 22, and the terminal 22 cannot detect the signal from the terminal 20. According to the IEEE802.11ax amendment, when the access point 10 is transmitting a frame to the terminal 20, the access point 12 uses the CCA threshold determined by the SR operation for the signal from the access point 10 detected by carrier sense. Therefore, the access point 12 determines that the channel is busy and waits for frame transmission. In this way, when the distance between wireless stations is short, transmission opportunities of frames decrease.

For example, real-time applications (RTAs) such as cloud gaming and industrial robot control applications require low communication latency. The decrease in frame transmission opportunities described above worsens the communication latency. Hereinafter, a frame containing high-priority data such as data requiring low latency will be referred to as a high-priority frame, and a frame containing low-priority data will be referred to as a low-priority frame.

In the first embodiment, the wireless station uses a higher CCA threshold when the transmission-scheduled frame is a high-priority frame than when the transmission-scheduled frame is a low-priority frame. As a result, when the transmission-scheduled frame is a high-priority frame, the channel is less likely to be determined to be busy, and the transmission opportunities of high-priority frames increase. Therefore, it is possible to secure the low latency required for high-priority frames while avoiding or reducing the problem of exposed terminals. In other words, highly reliable wireless communication is possible even under conditions where a plurality of BSSs overlaps.

In the communication system 50, wireless communication between the access point and the terminal is based on, for example, the IEEE 802.11 standard. The IEEE802.11 standard defines the MAC sublayers of Layer 1 and Layer 2 of the open systems interconnection (OSI) reference model. In the OSI reference model, communication functions are divided into seven layers (Layer 1: the physical layer, Layer 2: the data link layer, Layer 3: the network layer, Layer 4: the transport layer, Layer 5: the session layer, Layer 6: the presentation layer, and Layer 7: the application layer).

The data link layer includes, for example, a logical link control (LLC) layer and a media access control (MAC) layer. The LLC layer also adds a destination service access point (DSAP) header and a source service access point (SSAP) header and so forth to data input from a higher layer, for example, thereby forming LLC packets. The MAC layer, for example, adds MAC headers to LLC packets to generate MAC frames. A MAC frame is also called a MAC protocol data unit (MPDU). The physical layer, for example, adds a preamble or the like to the MAC frame to generate a wireless frame. A wireless frame is also called a physical layer (PHY) protocol data unit (PPDU).

Figure 2:
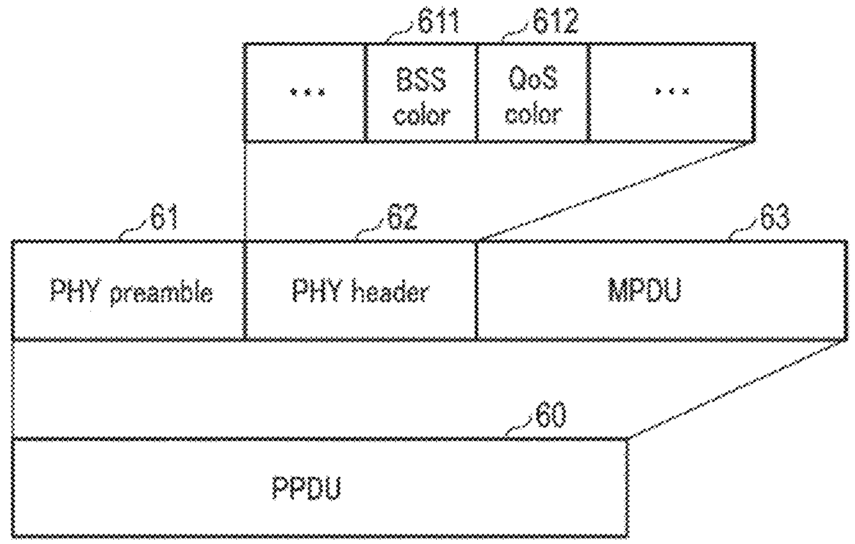
FIG. 2 is a diagram showing a frame format according to an embodiment of the present invention.

FIG. 2 schematically shows a structural example of a wireless frame 60 according to the first embodiment. As shown in FIG. 2, the wireless frame 60 includes a PHY preamble 61, a PHY header 62, and an MPDU 63. The PHY preamble 61 and the PHY header 62 are collectively called preamble.

The PHY preamble 61 contains fields that store information used for synchronization. The PHY header 62 includes fields that store control information. Specifically, the PHY header 62 includes a field for storing information necessary for data demodulation, a field 611 for storing identification information for identifying BSS, a field 612 for storing identification information for identifying frame priority, and the like. The identification information that identifies the BSS may be the BSS color defined in IEEE802.11ax, but is not limited to this.

In the high efficiency (HE) frame format defined in IEEE802.11ax, the preamble includes L-STF, L-LTF, L-SIG, HE-SIG-A, HE-STF, HE-LTF, and the like. HE-SIG-A contains a field for storing BSS color. L-STF, L-LTF, HE-STF and HE-LTF correspond to synchronization information, and L-SIG and HE-SIG-A correspond to control information.

Hereinafter, identification information for identifying a BSS will be referred to as BSS color, and identification information for identifying the priority of a frame will be referred to as QoS (Quality of Service) color. Priority is sometimes referred to as a QoS value. Frame priority is expressed in two or more levels. When the frame priority is expressed in two levels, the field 612 may have a length of 1 bit. For example, "0" is stored in the field 612 when the frame priority is a high priority level and "1" is stored in the field 612 when the frame priority is a low priority level. When frame priority is expressed in four levels, the field 612 may have a length of two bits. For example, "00" is associated with the highest priority level, "01" is associated with the second highest priority level, "10" is associated with the third highest priority level, and "11" is associated with the lowest priority level.

Note that the field 612 may be included in the field 611. In this case, the information included in the field 611 indicates identification information identifying the BSS and identification information identifying the priority of the frame. The field 611 or the field 612 may also be included in the PHY preamble 61 instead of the PHY header 62.

Next, configurations of the access point 10 and the terminal 20 will be described. The access point 12 can have the same configuration as the access point 10, and the terminal 22 can have the same configuration as the terminal 20. Therefore, descriptions of the configurations of the access point 12 and the terminal 22 are omitted.

Figure 3:
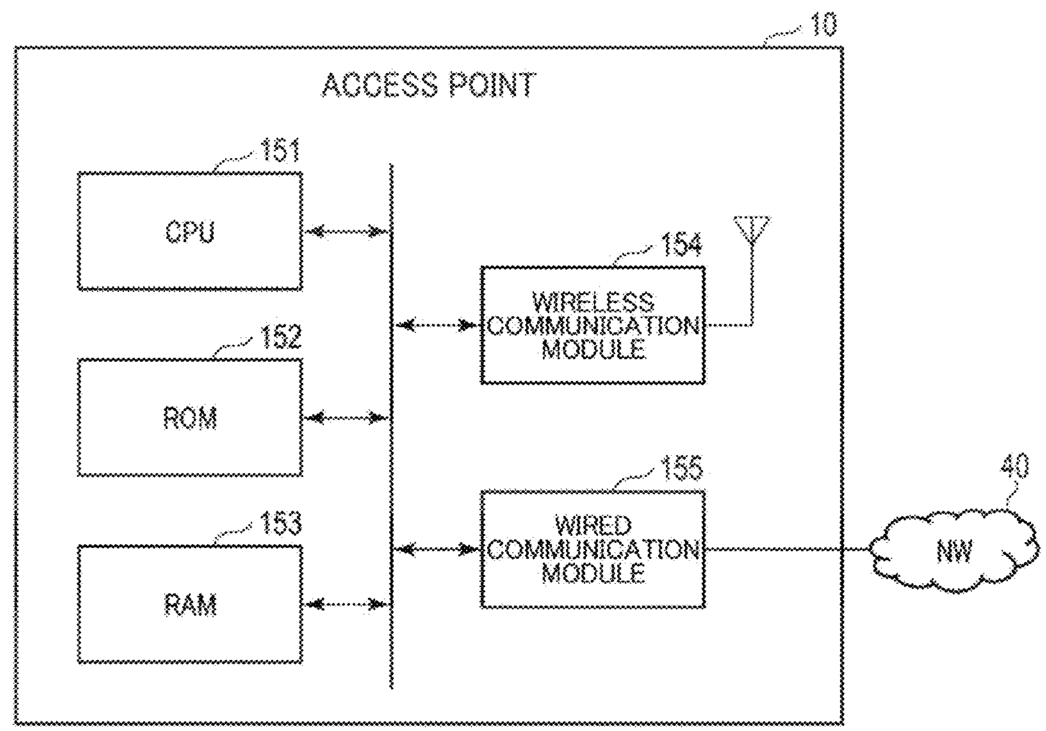
FIG. 3 is a block diagram showing the hardware configuration of the access point shown in FIG. 1.

FIG. 3 schematically shows an example of the hardware configuration of the access point 10. In the example shown in FIG. 3, the access point 10 includes a CPU (Central Processing Unit) 151, a ROM (Read Only Memory) 152, a RAM (Random Access Memory) 153, a wireless communication module 154, and a wired communication module 155.

The CPU 151 is a circuit capable of executing various programs, and controls overall operations of the access point 10. The ROM 152 is a non-volatile semiconductor memory and stores a program for controlling the access point 10, control data, and the like. The RAM 153 is, for example, a volatile semiconductor memory and is used as a working area of the CPU 151. The wireless communication module 154 is a circuit used for transmitting and receiving data by wireless signals. The wireless communication module 154 includes, for example, digital circuitry, analog circuitry, A/D converters, and D/A converters. Digital circuits include general-purpose processors such as CPUs. Alternatively or additionally, the digital circuitry may include dedicated processors such as ASICs (Application Specific Integrated Circuits) or FPGAs (Field Programmable Gate Arrays). Analog circuits include, for example, frequency upconverters, frequency downconverters, modulation circuits, demodulation circuits, and the like. The wireless communication module 154 is connected to the antenna. The wireless communication module 154 may include an antenna. The wired communication module 155 is a circuit used for transmitting and receiving data by wired signals, and is connected to the network 40.

Figure 4:
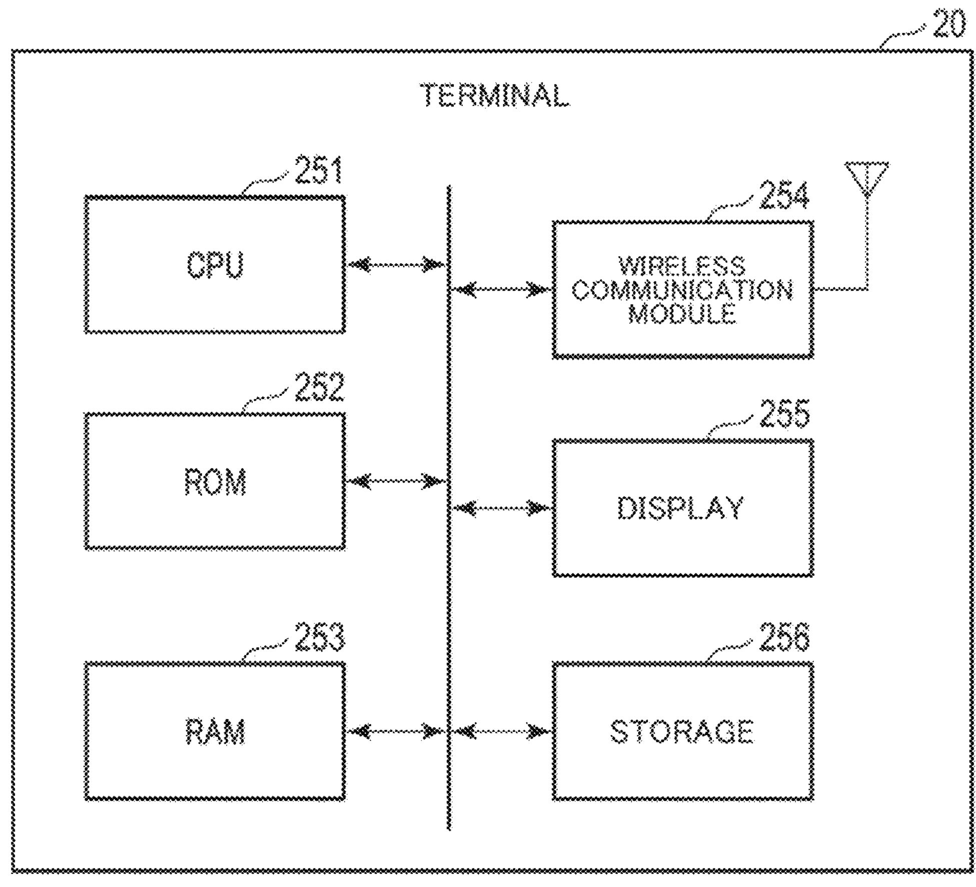
FIG. 4 is a block diagram showing the hardware configuration of the terminal shown in FIG. 1.

FIG. 4 schematically shows an example of the hardware configuration of the terminal 20. In the example shown in FIG. 4, the terminal 20 has a CPU 251, a ROM 252, a RAM 253, a wireless communication module 254, a display 255, and a storage 256. The CPU 251 is a circuit which can execute various programs, and controls an overall operation of the terminal 20. The ROM 252 is a nonvolatile semiconductor memory and holds programs for controlling the terminal 20, control data, and the like. The RAM 253 is, for example, a volatile semiconductor memory and is used as a working area of the CPU 251. The wireless communication module 254 is a circuit used to transmit and receive data by wireless signals and is connected to an antenna. The wireless communication module 254 may include an antenna. The display 255 displays information such as a GUI (Graphical User Interface) corresponding to application software, for example. The storage 256 is a non-volatile storage device and holds, for example, system software of the terminal 20.

The terminal 20 may further include an input interface. For example, the terminal 20 may be equipped with a touch screen.

Figure 5:
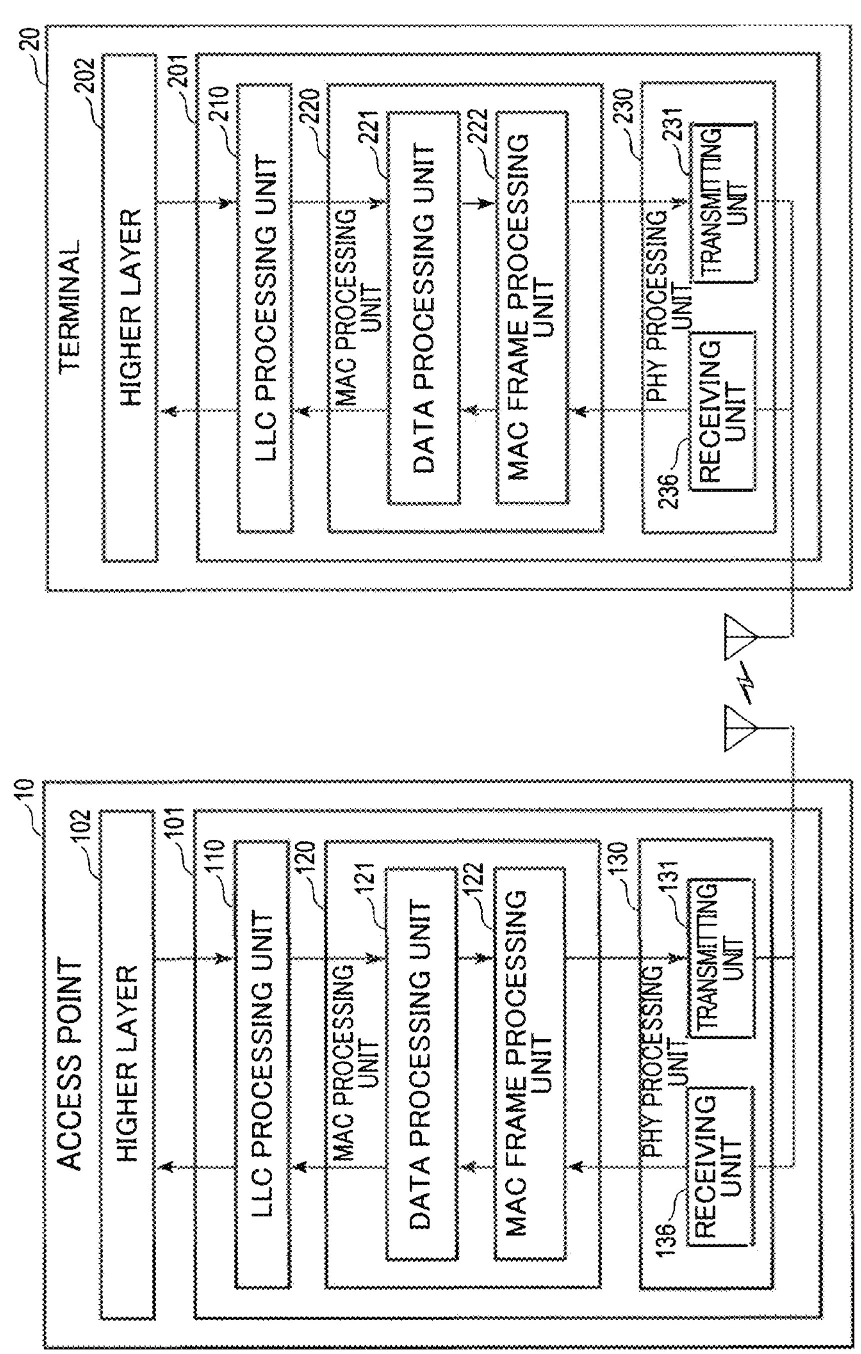
FIG. 5 is a block diagram showing functional configurations of the access point and the terminal shown in FIG. 1.

FIG. 5 schematically shows an example functional configuration of the access point 10 and the terminal 20. A wireless station (each of the access point 10 and the terminal 20) performs LLC layer processing, MAC layer processing, and PHY layer processing on data input from higher layers, thereby generating and transmitting a wireless signal including the data. The wireless station receives a wireless signal, performs PHY layer processing, MAC layer processing, and LLC layer processing on the received wireless signal, thereby extracting data from the received wireless signal and outputting the extracted data to higher layers. The higher layer is, for example, the application layer.

In the example shown in FIG. 5, the access point 10 includes a wireless unit 101 and a higher layer 102. The wireless unit 101 includes an LLC processing unit 110, a MAC processing unit 120, and a PHY processing unit 130. The wireless unit 101 is realized by a wireless communication module 154 or a combination of the CPU 151 and the wireless communication module 154, for example.

The LLC processing unit 110 has a role of an interface with the higher layer 102 and performs LLC layer processing. For example, when data addressed to the terminal 20 is input from the network 40 to the access point 10, the LLC processing unit 110 receives the data from the higher layer 102, adds a DSAP header, an SSAP header, and the like to the data, and generates an LLC packet. The LLC processing unit 110 receives data from the higher layer 102 together with the traffic type (TID: Traffic Identifier) of the data. TID is information indicating the priority of data. For example, data requiring low latency is assigned a high priority. The LLC processing unit 110 sends the LLC packet and TID to the MAC processing unit 120. When the LLC processing unit 110 receives an LLC packet from the MAC processing unit 120, the LLC processing unit 110 extracts data from the LLC packet and sends the extracted data to the higher layer 102.

The MAC processing unit 120 performs MAC layer processing. In the example shown in FIG. 5, the MAC processing unit 120 includes a data processing unit 121 and a The MAC frame processing unit 122.

When receiving an LLC packet and a TID from the LLC processing unit 110, the data processing unit 121 adds a MAC header including a destination address, a transmission source address, BSS information indicating BSS, TID, and the like, and an error detection code to the LLC packet to generate a MAC frame. The data processing unit 121 sends the MAC frame to the MAC frame processing unit 122. When the data processing unit 121 receives a MAC frame from the PHY processing unit 130 via the MAC frame processing unit 122, the data processing unit 121 demodulates the MAC frame to obtain a MAC header and an LLC packet. The data processing unit 121 determines whether the destination address included in the MAC header indicates its own station (specifically, the access point 10). When the destination address indicates the local station, the data processing unit 121 sends the LLC packet to the LLC processing unit 110. When the destination address does not indicate its own station, the data processing unit 121 discards the LLC packet.

The MAC frame processing unit 122 receives MAC frames from the data processing unit 121 and temporarily stores the MAC frames. Then, the MAC frame processing unit 122 performs carrier sense for a random time, confirms that the channel is idle, and then transmits the MAC frame to the PHY processing unit 130. The MAC frame processing unit 122 determines that the channel is busy when the reception power observed in the PHY processing unit 130 is higher than the CCA threshold, otherwise the channel is idle. Received Signal Strength Indicator (RSSI) as reception power is measured by the PHY processing unit 130 and provided to the MAC frame processing unit 122. The MAC frame processing unit 122 determines the CCA threshold according to the combination of the BSS color value included in the preamble of the wireless frame detected by carrier sense and the priority of the frame to be transmitted to the terminal 20. The MAC frame processing unit 122 identifies the priority of the transmission-scheduled frame based on the TID information included in the MAC header of the MAC frame received from the data processing unit 121. Note that the MAC frame processing unit 122 may identify the priority of the transmission-scheduled frame based on information other than TID information, such as AID (Association Identifier) information. A method for determining the CCA threshold will be described later.

The MAC frame processing unit 122 may control transmission power for transmitting the transmission-scheduled frame. The MAC frame processing unit 122 may control transmission power, for example, based on the priority of the transmission-scheduled frame. The MAC frame processing unit 122 sends information indicating transmission power to the PHY processing unit 130 together with the MAC frame.

In this way, the MAC frame processing unit 122 functions as a threshold determination unit that determines the CCA threshold and a carrier sense control unit that performs carrier sense and determines the usage state of the channel and may further function as a power control unit that controls transmission power for transmitting a transmission-scheduled frame.

The PHY processing unit 130 performs PHY layer processing. In the example shown in FIG. 5, the PHY processing unit 130 includes a transmitting unit 131 and a receiving unit 136.

When receiving a MAC frame from the MAC processing unit 120, the transmitting unit 131 adds a preamble and the like to the MAC frame to generate a wireless frame. The preamble contains BSS color and QoS color. The transmitting unit 131 converts the wireless frame into a wireless signal and transmits the wireless signal via an antenna.

The receiving unit 136 receives a wireless signal via an antenna and converts the received wireless signal into a wireless frame. The receiving unit 136 first obtains the BSS color and QoS color included in the preamble of the wireless frame and sends them to the MAC processing unit 120, then extracts the MAC frame from the wireless frame and sends it to the MAC processing unit 120.

Figure 6:
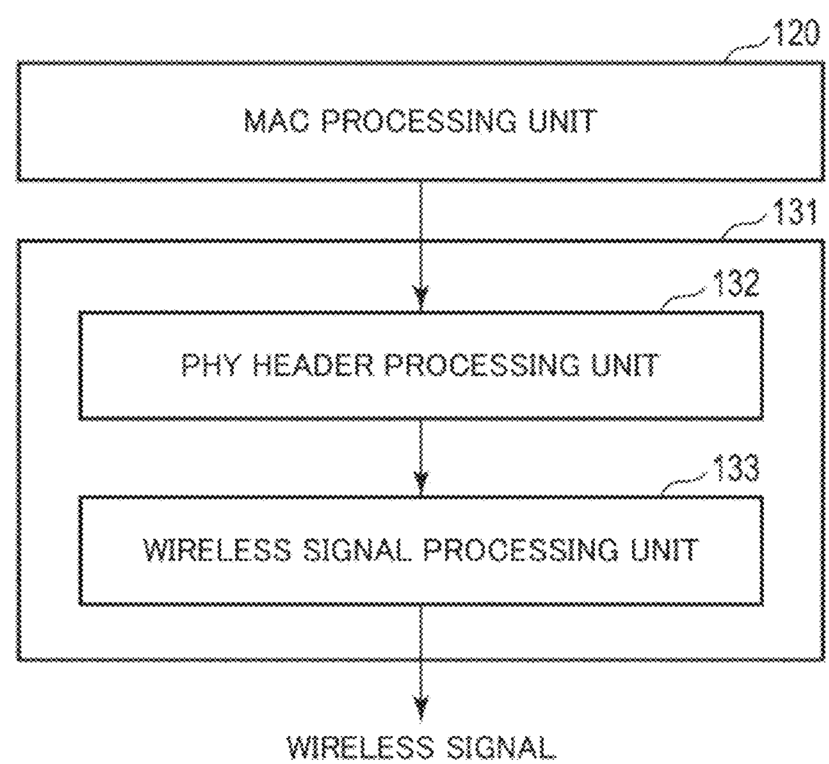
FIG. 6 is a block diagram showing a transmitting unit shown in FIG. 5.

FIG. 6 schematically shows a configuration example of the transmitting unit 131. As shown in FIG. 6, the transmitting unit 131 includes a PHY header processing unit 132 and a wireless signal processing unit 133.

As described above, the MAC processing unit 120 sends a MAC frame to the transmitting unit 131 after confirming that the channel is idle. That is, the MAC processing unit 120 transmits the MAC frame to the transmitting unit 131 after acquiring the transmission right.

The PHY header processing unit 132 receives the MAC frame from the MAC processing unit 120. The PHY header processing unit 132 adds a PHY header including information such as BSS color and QoS color and a PHY preamble to the MAC frame to generate a wireless frame. The PHY header processing unit 132 determines the value of BSS color based on the BSS information included in the MAC header, and determines the value of QoS color based on the TID information included in the MAC header. Note that QoS color may be determined based on information other than TID information, such as AID information. By determining the QoS color value based on the AID information, it is possible to set the priority for each terminal. For example, all frames transmitted by terminals assigned a specific AID by the access point 10 are set to high priority.

The higher the priority of data, the higher the frame priority is set. TID is expressed in two or more stages. For example, it is assumed that the TID is expressed in two values #1 and #2, and the priority of data is higher in the order of #1 and #2. In this case, the transmitting unit 131 may set QoS color to a value (for example, "0") indicating that the frame priority is high when TID is #1, and set QoS color to a value (for example, "1") indicating that the frame priority is low when TID is #2. Also assume that the TID is expressed in three values #1, #2, and #3, and the priority of data is higher in the order of #1, #2, and #3. In this case, the transmitting unit 131 may set QoS color to a value (for example, "0") indicating that the frame priority is high when TID is #1, and set QoS color to a value (for example, "1") indicating that the frame priority is low when TID is #2 or #3. These are just examples of the method for determining the QoS color.

The wireless signal processing unit 133 receives the wireless frame from the PHY header processing unit 132, performs a predetermined modulation operation on the wireless frame, converts the wireless frame into a wireless signal, and transmits the wireless signal via an antenna. Predetermined modulation operations include, for example, convolutional coding, interleaving, subcarrier modulation, Inverse Fast Fourier Transform (IFFT), Orthogonal Frequency Division Multiplexing (OFDM) modulation, and frequency conversion.

Figure 7:
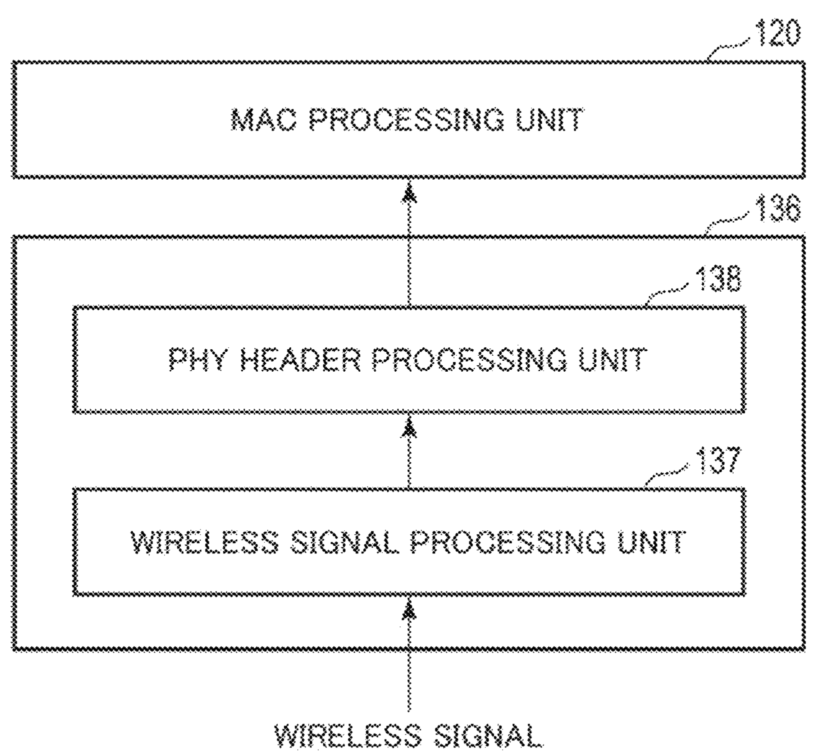
FIG. 7 is a block diagram showing a receiving unit shown in FIG. 5.

FIG. 7 schematically shows a configuration example of the receiving unit 136. As shown in FIG. 7, the receiving unit 136 includes a wireless signal processing unit 137 and a PHY header processing unit 138.

The wireless signal processing unit 137 performs a predetermined demodulation operation on the wireless signal received by the antenna, and outputs the resulting wireless frame to the PHY header processing unit 138. Predetermined demodulation operations include, for example, frequency transform, OFDM demodulation, Fast Fourier Transform (FFT), subcarrier demodulation, deinterleaving, and Viterbi decoding.

Further, the wireless signal processing unit 137 measures the RSSI of the received wireless signal. The wireless signal processing unit 137 notifies the MAC processing unit 120 of the RSSI via the PHY header processing unit 138.

The PHY header processing unit 138 receives the wireless frame from the wireless signal processing unit 137 and identifies information included in the preamble (specifically, the PHY header) of the wireless frame, such as the BSS color and QoS color. The PHY header processing unit 138 performs the following operations based on the BSS color and QoS color included in the preamble.

At the time of frame reception, when the BSS color indicates its own BSS (specifically, the BSS to which the access point 10 belongs), the PHY header processing unit 138 continues the demodulation operation of the wireless signal processing unit 137, sends the BSS color and QoS color extracted from the preamble of the wireless frame to the MAC processing unit 120, and then sends the MAC frame extracted from the wireless frame to the MAC processing unit 120. The PHY header processing unit 138 stops the demodulation operation of the wireless signal processing unit 137 when the BSS color does not indicate its own BSS. The PHY header processing unit 138 sends BSS color and QoS color to the MAC processing unit 120 even when the demodulation operation is stopped.

During carrier sense, the PHY header processing unit 138 notifies the MAC processing unit 120 of the BSS color and QoS color values extracted from the preamble of the wireless frame.

Referring to FIG. 5 again, the terminal 20 includes a wireless unit 201 and a higher layer 202. The wireless unit 201 includes an LLC processing unit 210, a MAC processing unit 220 and a PHY processing unit 230. The wireless unit 201 is realized by a wireless communication module 254 or a combination of the CPU 251 and the wireless communication module 254, for example.

The LLC processing unit 210, the MAC processing unit 220, and the PHY processing unit 230 perform the same operations as the LLC processing unit 110, the MAC processing unit 120, and the PHY processing unit 130, respectively. Therefore, detailed descriptions of the LLC processing unit 210, the MAC processing unit 220, and the PHY processing unit 230 are omitted.

The LLC processing unit 210 has a role of interface with the higher layer 202 and performs LLC layer processing. For example, when data is input from the higher layer 202 to the wireless unit 201, the LLC processing unit 210 adds a DSAP header, an SSAP header, and the like to the data to generate an LLC packet. The LLC processing unit 210 sends LLC packets to the MAC processing unit 220. When the LLC processing unit 210 receives an LLC packet from the MAC processing unit 220, the LLC processing unit 210 extracts data from the LLC packet and sends the extracted data to the higher layer 202.

The MAC processing unit 220 performs MAC layer processing. In the example shown in FIG. 5, the MAC processing unit 220 includes a data processing unit 221 and a MAC frame processing unit 222. The MAC frame processing unit 222 is also called a carrier sense control unit. The data processing unit 221 and the MAC frame processing unit 222 perform operations similar to the data processing unit 121 and the MAC frame processing unit 122, respectively.

When the data processing unit 221 receives an LLC packet from the LLC processing unit 210, the data processing unit 221 adds a MAC header including a destination address, a source address, TID, and the like, and an error detection code to the LLC packet to generate a MAC frame. The data processing unit 221 sends the MAC frame to the MAC frame processing unit 222. When receiving a MAC frame from the PHY processing unit 230, the data processing unit 221 demodulates the MAC frame to obtain a MAC header and an LLC packet. When the destination address included in the MAC header indicates its own station (specifically, the terminal 20), the data processing unit 221 sends an LLC packet to the LLC processing unit 210.

The MAC frame processing unit 222 receives MAC frames from the data processing unit 221 and temporarily stores the MAC frames. Then, the MAC frame processing unit 222 performs carrier sense for a random time, confirms that the channel is idle, and then transmits the MAC frame to the PHY processing unit 230.

The PHY processing unit 230 performs PHY layer processing. In the example shown in FIG. 5, the PHY processing unit 230 includes a transmitting unit 231 and a receiving unit 236.

When receiving a MAC frame from the MAC processing unit 220, the transmitting unit 231 adds a preamble including the BSS color and the QoS color and the like to the MAC frame to generate a wireless frame. The transmitting unit 231 determines the BSS color value based on the BSS information included in the MAC header, and determines the QoS color value based on the TID information included in the MAC header. The transmitting unit 231 converts the wireless frame into a wireless signal and transmits the wireless signal via an antenna.

The receiving unit 236 receives a wireless signal via an antenna and performs a demodulation operation on the received wireless signal to obtain a wireless frame. At the time of frame reception, when the BSS color included in the preamble of the wireless frame indicates its own BSS (specifically, the BSS to which the terminal 20 belongs), the receiving unit 236 sends the MAC frame extracted from the wireless frame together with the BSS color and QoS color extracted from the preamble of the wireless frame to the MAC processing unit 220. When the BSS color does not indicate its own BSS, the receiving unit 236 ends the demodulation operation. The receiving unit 236 sends the BSS color and the QoS color to the MAC processing unit 220 even when the demodulation operation ends halfway. During carrier sense, the receiving unit 236 notifies the MAC processing unit 220 of the BSS color and QoS color values extracted from the preamble of the wireless frame.

Further, the receiving unit 236 measures RSSI for the received wireless signal. The receiving unit 236 notifies the MAC processing unit 220 of the RSSI.

Figure 8:
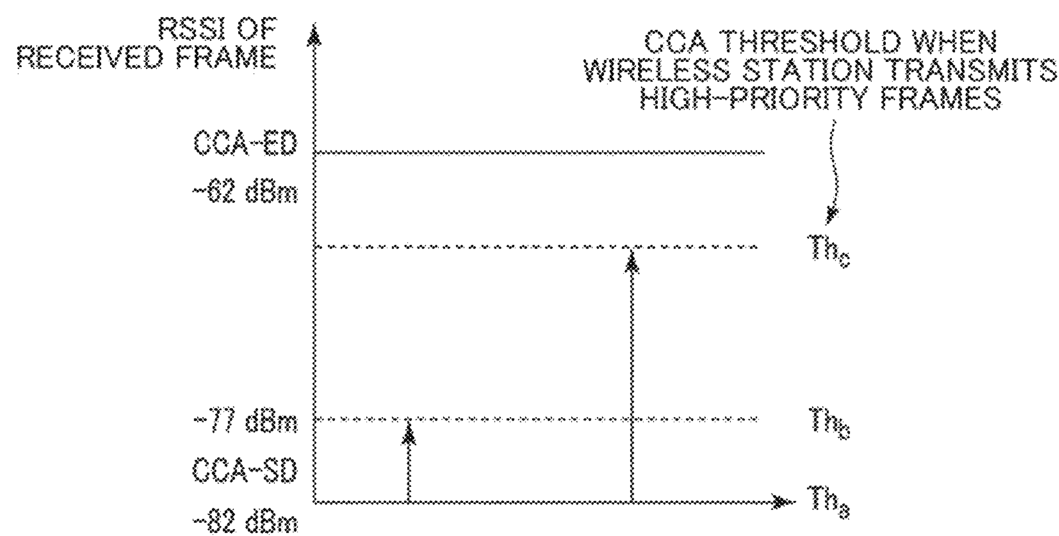
FIG. 8 is a diagram explaining an example of a method for determining a CCA threshold in the MAC frame processing unit shown in FIG. 5.

Next, a method for determining the CCA threshold will be described with reference to FIG. 8. Here, the access point 10 will be described, but the same method can be applied to the terminal 20 as well. In FIG. 8, −62 dBm written together with CCA-ED (Energy Detection) is the CCA threshold used when the signal detected by carrier sense is not recognized as a frame based on the IEEE802.11 standard.

The MAC frame processing unit 122 of the access point 10 determines the CCA threshold based on the value of BSS color included in the preamble of the wireless frame detected by carrier sense and the priority of the wireless frame that the access point 10 is about to transmit to the terminal 20.

When BSS color indicates the BSS to which the access point 10 belongs, the MAC frame processing unit 122 sets the CCA threshold to $Th_a$. $Th_a$ is, for example, −82 dBm. $Th_a$ may be lower than −82 dBm. In FIG. 8, −82 dBm written together with CCA-SD (Signal Detection) is the default CCA threshold used when the signal detected by carrier sense is recognized as a frame based on the IEEE802.11 standard.

When the BSS color does not indicate the BSS to which the access point 10 belongs, the MAC frame processing unit 122 determines the CCA threshold based on the priority of the transmission-scheduled frame. The MAC frame processing unit 122 identifies the priority of the transmission-scheduled frame, for example, based on the TID information included in the transmission-scheduled frame.

Referring again to the example above, it is assumed that the frame priority is expressed in two levels, the TID is expressed in two values #1 and #2, and the priority of data is higher in the order of #1 and #2.

When the TID information is "#2", that is, when the frame priority is a low priority level, the MAC frame processing unit 122 sets the CCA threshold to $Th_b$. Here, $Th_b$ is larger than $Th_a$ ($Th_a<Th_b$). $Th_b$ is, for example, −77 dBm (SR value).

When the TID information is "#1", that is, when the frame priority is a high priority level, the MAC frame processing unit 122 sets the CCA threshold to $Th_c$. Here, $Th_c$ is larger than $Th_b$ ($Th_c>Th_b$). $Th_c$ is typically less than −62 dBm, for example, −67 dBm. Note that $Th_c$ may be −62 dBm or more.

The frame priority is expressed in four levels, TID is expressed in four values #1, #2, #3, #4, and the priority of data is higher in the order of #1, #2, #3, and #4. The CCA threshold is set to a value corresponding to the priority of the transmission-scheduled frame. Specifically, the higher the priority of the transmission-scheduled frame, the larger the CCA threshold is set.

When the TID information is "#4", that is, when the frame priority is the lowest priority level, the MAC frame processing unit 122 sets the CCA threshold to $Th_b$. Here, $Th_b$ is larger than $Th_a$ ($Th_a<Th_b$). When the TID information is "#3", that is, when the frame priority is the third highest priority level, the MAC frame processing unit 122 sets the CCA threshold to $Th_c$. Here, $Th_c$ is larger than $Th_b$ ($Th_c>Th_b$). When the TID information is "#2", that is, when the frame priority is the second highest priority level, the MAC frame processing unit 122 sets the CCA threshold to $Th_d$. Here, $Th_d$ is larger than $Th_c$ ($Th_d>Th_c$). When the TID information is "#1", that is, when the frame priority is the highest priority level, the MAC frame processing unit 122 sets the CCA threshold to $Th_e$. Here, $Th_e$ is larger than $Th_d$ ($Th_e>Th_d$).

[Operation]

Next, the operation of the communication system 50 will be described.

Figure 9:
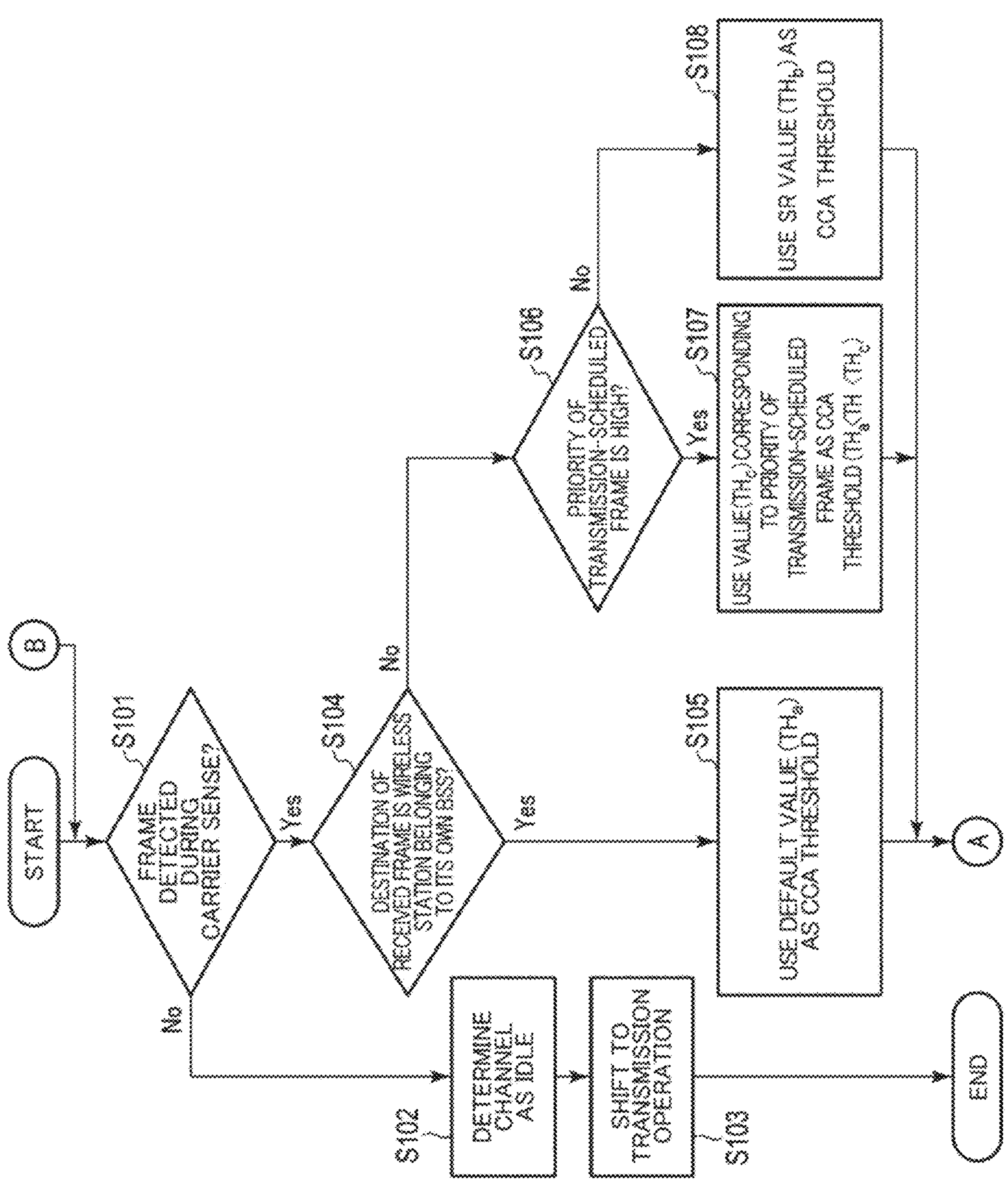
FIG. 9 is a flowchart showing an example of the operation of the access point shown in FIG. 5.
Figure 10:
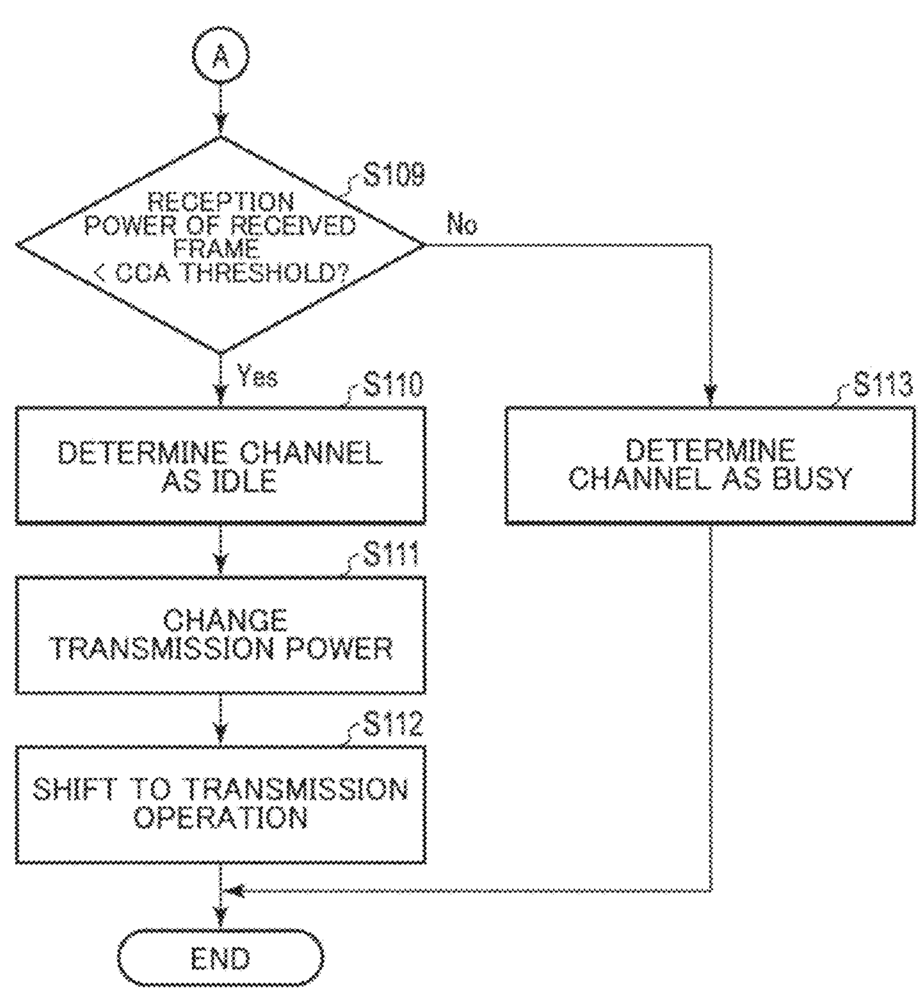
FIG. 10 is a flowchart showing an example of the operation of the access point shown in FIG. 5.

FIGS. 9 and 10 schematically show an example of transmission processing procedures executed by the access point 10. The MAC frame processing unit 122 of the access point 10 performs carrier sense based on CSMA/CA before frame transmission. For example, the MAC frame processing unit 122 starts carrier sense in response to receiving a MAC frame from the data processing unit 121. Although the access point 10 performs the flow shown in FIGS. 9 and 10, the flow shown in FIGS. 9 and 10 may be executed by the terminal 22.

When no frame is detected by carrier sense (step S101 in FIG. 9; No), the processing proceeds to step S102. In step S102, the MAC frame processing unit 122 determines that the channel is idle. In step S103, the access point 10 shifts to a frame transmission operation. For example, the MAC frame processing unit 122 sends a MAC frame to the transmitting unit 131, and the transmitting unit 131 generates a wireless frame from the MAC frame and transmits the wireless frame.

When a frame is detected by carrier sense (step S101; Yes), the processing proceeds to step S104. In step S104, the MAC frame processing unit 122 determines whether the destination of the received frame, which is the detected frame, is a wireless station belonging to its own BSS. For example, the receiving unit 136 extracts the BSS color from the preamble of the received frame by demodulating the preamble of the received frame, and the MAC frame processing unit 122 determines whether the BSS color extracted by the receiving unit 136 matches the BSS color of its own BSS. The MAC frame processing unit 122 determines that the destination of the received frame is a wireless station belonging to its own BSS when the BSS color of the received frame matches the BSS color of its own BSS, and determines that the destination of the received frame is not a wireless station belonging to its own BSS when the BSS color of the received frame does not match the BSS color of its own BSS.

When the destination of the received frame is a wireless station belonging to its own BSS (step S104; Yes), the processing proceeds to step S105. In step S105, the MAC frame processing unit 122 determines to use the default value $Th_a$ as the CCA threshold. Specifically, the MAC frame processing unit 122 sets the CCA threshold to value $Th_a$.

When the destination of the received frame is not a wireless station belonging to its own BSS (step S104; No), the processing proceeds to step S106. In step S106, the MAC frame processing unit 122 determines whether the priority of the transmission-scheduled frame is high. For example, the MAC frame processing unit 122 determines whether the priority of the transmission-scheduled frame is high based on the TID information of the transmission-scheduled frame. For example, the MAC frame processing unit 122 determines that the priority of the transmission-scheduled frame is low when the TID information is "#2", and determines that the priority of the transmission-scheduled frame is high when the TID information is "#1".

When the priority of the transmission-scheduled frame is not high (step S106; No), in step S108, the MAC frame processing unit 122 determines to use the SR value $Th_b$ as the CCA threshold. Here, $Th_b$ is larger than $Th_a$ ($Th_a<Th_b$). Specifically, the MAC frame processing unit 122 sets the CCA threshold to value $Th_b$.

When the priority of the transmission-scheduled frame is high (step S106; Yes), in step S107, the MAC frame processing unit 122 determines to use the value $Th_c$ corresponding to the priority of the transmission-scheduled frame as the CCA threshold. Here, $Th_c$ is larger than $Th_b$ ($Th_c>Th_b$). Specifically, the MAC frame processing unit 122 sets the CCA threshold to value $Th_c$.

After the CCA threshold is determined in step S105, S107, or S108, the processing proceeds to step S109 in FIG. 10. In step S109, the MAC frame processing unit 122 compares the power of the received frame with the CCA threshold.

When the power of the received frame is less than the CCA threshold (step S109; Yes), the processing proceeds to step S110. In step S110, the MAC frame processing unit 122 determines that the channel is idle. In optional step S111, the MAC frame processing unit 122 changes the transmission power for transmitting the transmission-scheduled frame. For example, the MAC frame processing unit 122 increases the transmission power as the priority of the transmission-scheduled frame is higher. For example, the MAC frame processing unit 122 sets the transmission power to the default power level when the priority of the transmission-scheduled frame is low, and sets the transmission power to a power level higher than the default power level when the priority of the transmission-scheduled frame is high.

Note that the MAC frame processing unit 122 may set the transmission power to a power level corresponding to the threshold. In this case, a plurality of values used as thresholds is associated with a plurality of power levels. For example, a value $Th_a$ is associated with a first power level, a value $Th_b$ is associated with a second power level higher than the first power level, and a value $Th_c$ is associated with a third power level higher than the second power level. The MAC frame processing unit 122 sets the transmission power to the first power level when $Th_a$ is used as the CCA threshold, sets the transmission power to the second power level when $Th_b$ is used as the CCA threshold, and sets the transmission power to the third power level when $Th_c$ is used as the CCA threshold.

In step S112, the access point 10 shifts to a frame transmission operation. For example, the transmitting unit 131 starts frame transmission. For example, the MAC frame processing unit 122 sends a MAC frame to the transmitting unit 131, and the transmitting unit 131 generates a wireless frame from the MAC frame and transmits the wireless frame with transmission power specified by The MAC frame processing unit 122.

When the power of the received frame is larger than or equal to the CCA threshold (step S109; No), the processing proceeds to step S113. In step S113, the MAC frame processing unit 122 determines that the channel is busy, and the access point 10 does not shift to a frame transmission operation.

Figure 11:
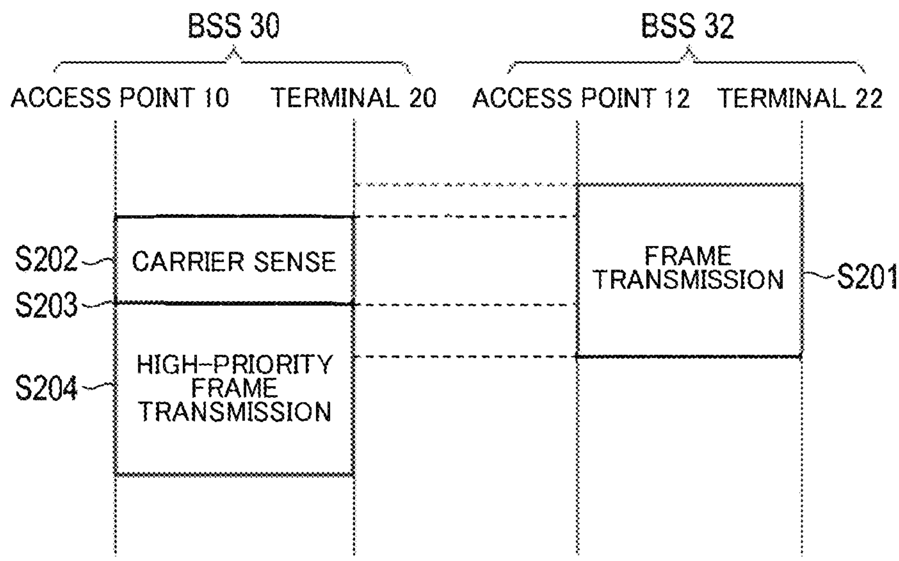
FIG. 11 is a time chart showing an example of the operation of the communication system shown in FIG. 1.

FIG. 11 schematically shows an example of the operation of the communication system 50. The BSS 30 includes the access point 10 and the terminal 20, and the BSS 32 includes the access point 12 and the terminal 22, as described with reference to FIG. 1. In the example shown in FIG. 11, it is assumed that the access point 10 requests the terminal 20 to transmit a high-priority frame while the access point 12 is transmitting a low-priority frame to the terminal 22. Further, it is assumed that the reception power of frames received by the access point 10 from the access point 12 is between $Th_b$ and $Th_c$.

In step S201 of FIG. 11, the access point 12 starts transmitting low-priority frames to the terminal 22.

In step S202, the access point 10 issues a request to transmit a high-priority frame to the terminal 20, and the access point 10 performs carrier sense based on CSMA/CA. The access point 10 detects frames from the access point 12 to the terminal 22 by carrier sense. The access point 10 checks the BSS color included in the preamble of the detected frame and recognizes that the destination of the detected frame is not a wireless station within the BSS 30. That is, the access point 10 recognizes that the detected frame is a frame related to another BSS. Subsequently, the access point 10 checks the TID information of the transmission-scheduled frame and recognizes that the priority of the transmission-scheduled frame is high. As a result, the access point 10 sets the CCA threshold to $Th_c$.

In step S203, the access point 10 recognizes that the reception power of the detected frame is lower than the CCA threshold and determines that the channel is idle. In step S204, the access point 10 starts transmitting high-priority frames to the terminal 20.

[Effects]

In the first embodiment, a wireless station performs carrier sense based on CSMA/CA before frame transmission. The wireless station obtains the BSS color from the preamble of the received frame, which is the frame detected by carrier sense, and determines the CCA threshold based on the BSS color and the TID information of the transmission-scheduled frame. Based on the BSS color, the wireless station determines whether the received frame is related to its own BSS. When the received frame is related to its own BSS, the wireless station sets the CCA threshold to the default value $Th_a$. When the received frame is related to another BSS, the wireless station determines whether the priority of the transmission-scheduled frame is low or high based on the TID information of the transmission-scheduled frame. Specifically, the wireless station determines whether the priority of the transmission-scheduled frame is the first priority level or the second priority level higher than the first priority level. When the priority of the transmission-scheduled frame is low, the wireless station sets the CCA threshold to a value $Th_b$ larger than the value $Th_a$. When the priority of the transmission-scheduled frame is high, the wireless station sets the CCA threshold to a value $Th_c$ higher than the value $Th_b$. The wireless station determines the usage state of a channel based on a comparison of the reception power of the received frame and the CCA threshold.

When the received frame is a frame related to another BSS, the CCA threshold is set to a larger value than when the received frame is a frame related to its own BSS. In this way, it is possible to avoid or mitigate the exposed terminal problem. Furthermore, when the priority of the transmission-scheduled frame is high, the CCA threshold is set to a larger value than when the priority of the transmission-scheduled frame is low. When the priority of the transmission-scheduled frame is high, it becomes difficult to determine that the channel is busy, and the transmission opportunities of high-priority frames increase. In this way, it is possible to ensure the low latency required for high-priority frames. For example, high-priority frames are transmitted in a state of being superimposed on frames related to other BSSs, and early transmission of high-priority frames is realized. Also, transmitting a high-priority frame in a state of being superimposed on frames related to other BSSs leads to utilization of the capture effect. Therefore, highly reliable wireless communication is provided even in situations where a plurality of BSSs overlaps.

The wireless station may control the transmission power so that the higher the priority of the transmission-scheduled frame, the higher the transmission power when transmitting the transmission-scheduled frame. This allows higher-priority frames to reach their destination more reliably. Alternatively, the wireless station may set the transmission power for transmitting the transmission-scheduled frame to a power level corresponding to the threshold. This allows higher-priority frames to more reliably reach their destination while protecting frames related to other BSSs.

Second Embodiment

In the second embodiment, another example of the CCA threshold determination method performed by the wireless station will be described. In the second embodiment, the CCA threshold is determined further based on the priority of frames detected by carrier sense. In the second embodiment, descriptions of parts and operations similar to those described in the first embodiment will be omitted as appropriate.

Figure 12:
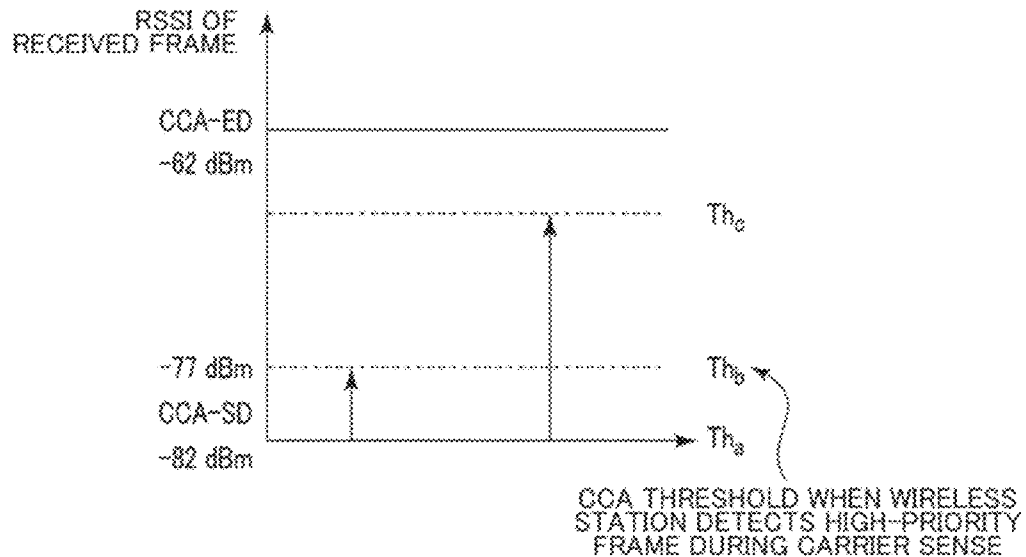
FIG. 12 is a diagram explaining another example of the method for determining the CCA threshold in the MAC frame processing unit shown in FIG. 5.

The access point 10 determines the CCA threshold based on the BSS color and QoS color of the received frame, which is the frame detected by carrier sense, and the TID information of the transmission-scheduled frame. The access point 10 determines whether the received frame is a high-priority frame or a low-priority frame based on the QoS color of the received frame. For example, the access point 10 determines that the received frame is a high-priority frame when the QoS color of the received frame is a value (for example, "0") indicating a high priority, and determines that the received frame is a low-priority frame when the QoS color of the received frame is a value (for example, "1") indicating a low priority. When the access point 10 detects a high-priority frame during carrier sense, the access point 10 sets the CCA threshold to a value $Th_b$ less than $Th_c$. As an example, as shown in FIG. 12, the value $Th_b$ is the SR value.

FIG. 13 schematically shows an example of a threshold determination procedure according to the second embodiment. The flow shown in FIG. 13 is obtained by adding step S151 to the flow shown in FIG. 9. Step S151 is added between step S104 and step S106. Although the access point 10 executes the flow shown in FIG. 13, the flow shown in FIG. 13 may be executed by the terminal 22.

As shown in FIG. 13, the MAC frame processing unit 122 of the access point 10 performs carrier sense based on CSMA/CA before frame transmission. When a frame is detected by carrier sense (step S101; Yes), the MAC frame processing unit 122 determines whether the destination of the received frame, which is the detected frame, is a wireless station belonging to its own BSS (step S104).

When the destination of the received frame is a wireless station belonging to its own BSS (step S104; Yes), the MAC frame processing unit 122 determines to use the default value $Th_a$ as the CCA threshold (step S105).

When the destination of the received frame is not the wireless station belonging to its own BSS (step S104; No), the processing proceeds to step S151. In step S151, the MAC frame processing unit 122 determines whether the priority of the received frame is low. For example, the receiving unit 136 of the access point 10 extracts the QoS color from the preamble of the received frame by demodulating the preamble of the received frame, and the MAC frame processing unit 122 determines whether the priority of the received frame is low based on the QoS color extracted by the receiving unit 136. For example, the MAC frame processing unit 122 determines that the priority of the received frame is low when the QoS color value of the received frame is "1," and determines that the priority of the received frame is high when the QoS color value of the received frame is "0."

When the priority of the received frame is not low, that is, when the received frame is a high-priority frame (step S151; No), the processing proceeds to step S108. In step S108, the MAC frame processing unit 122 determines to use the SR value $Th_b$ as the CCA threshold. Here, $Th_b$ is larger than $Th_a$ ($Th_b > Th_a$).

When the priority of the received frame is low, that is, when the received frame is a low-priority frame (step S151; Yes), the processing proceeds to step S106. In step S106, the MAC frame processing unit 122 determines whether the priority of the transmission-scheduled frame is high. When the priority of the transmission-scheduled frame is not high (step S106; No), the MAC frame processing unit 122 determines to use the SR value $Th_b$ as the CCA threshold (step S108). When the priority of the transmission-scheduled frame is high (step S106; Yes), the MAC frame processing unit 122 determines to use the value $Th_c$ corresponding to the priority of the transmission-scheduled frame as the CCA threshold (step S107). Here, $Th_c$ is larger than $Th_b$ ($Th_c > Th_b$).

The processing after the CCA threshold is determined in step S105, S107 or S108 is the same as described above with reference to FIG. 10.

Figure 14A:
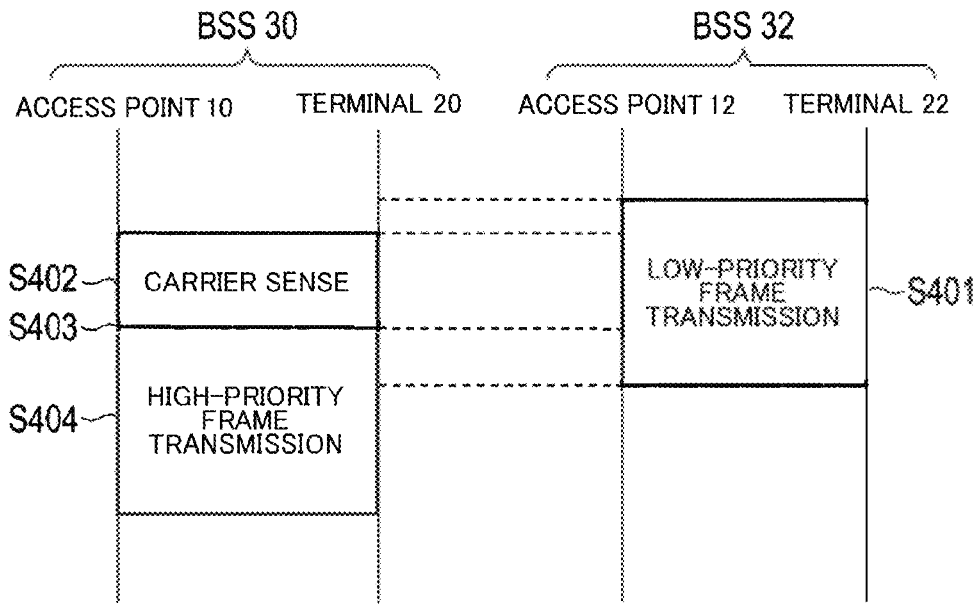
FIG. 14A is a time chart showing another example of the operation of the communication system shown in FIG. 1.
Figure 14B:
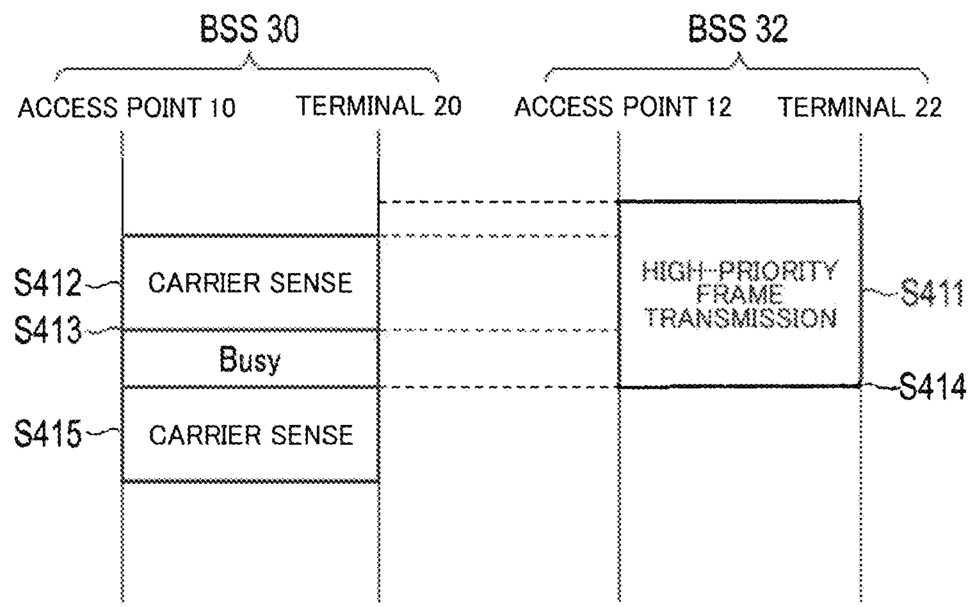
FIG. 14B is a time chart showing another example of the operation of the communication system shown in FIG. 1.

FIGS. 14A and 14B schematically show an example of the operation of the communication system 50 according to the second embodiment. The BSS 30 includes the access point 10 and the terminal 20, and the BSS 32 includes the access point 12 and the terminal 22, as described with reference to FIG. 1. In the example shown in FIG. 14A, the access point 10 requests the terminal 20 to transmit a high-priority frame while the access point 12 is transmitting a low-priority frame to the terminal 22. In the example shown in FIG. 14B, the access point 10 requests the terminal 20 to transmit a high-priority frame while the access point 12 is transmitting a high-priority frame to the terminal 22. In both examples of FIGS. 14A and 14B, it is assumed that the reception power of frames received by the access point 10 from the access point 12 is between $Th_b$ and $Th_c$.

In step S401 of FIG. 14A, the access point 12 starts transmitting low-priority frames to the terminal 22. In step S402, the access point 10 issues a request to transmit a high-priority frame to the terminal 20, and the access point 10 performs carrier sense based on CSMA/CA. The access point 10 detects frames from the access point 12 to the terminal 22 by carrier sense. The access point 10 checks the BSS color and QoS color included in the preamble of the detected frame and recognizes that the detected frame is a low-priority frame related to another BSS. Subsequently, the access point 10 checks the TID information of the transmission-scheduled frame and recognizes that the transmission-scheduled frame is a high-priority frame. As a result, the access point 10 sets the CCA threshold to $Th_c$.

In step S403, the access point 10 recognizes that the reception power of the detected frame is lower than the CCA threshold and determines that the channel is idle. In step S404, the access point 10 starts transmitting high-priority frames to the terminal 20.

In step S411 of FIG. 14B, the access point 12 starts transmitting high-priority frames to the terminal 22. In step S412, the access point 10 issues a request to transmit a high-priority frame to the terminal 20, and the access point 10 performs carrier sense based on CSMA/CA. The access point 10 detects frames from the access point 12 to the terminal 22 by carrier sense. The access point 10 checks the BSS color and QoS color included in the preamble of the detected frame and recognizes that the detected frame is a high-priority frame related to another BSS. As a result, the access point 10 sets the CCA threshold to $Th_b$.

In step S413, the access point 10 recognizes that the reception power of the detected frame is higher than the CCA threshold, and determines that the channel is busy. In step S414, the access point 12 finishes transmitting the high-priority frame to the terminal 22, and in step S415, the access point 10 performs carrier sense again.

Figure 15:
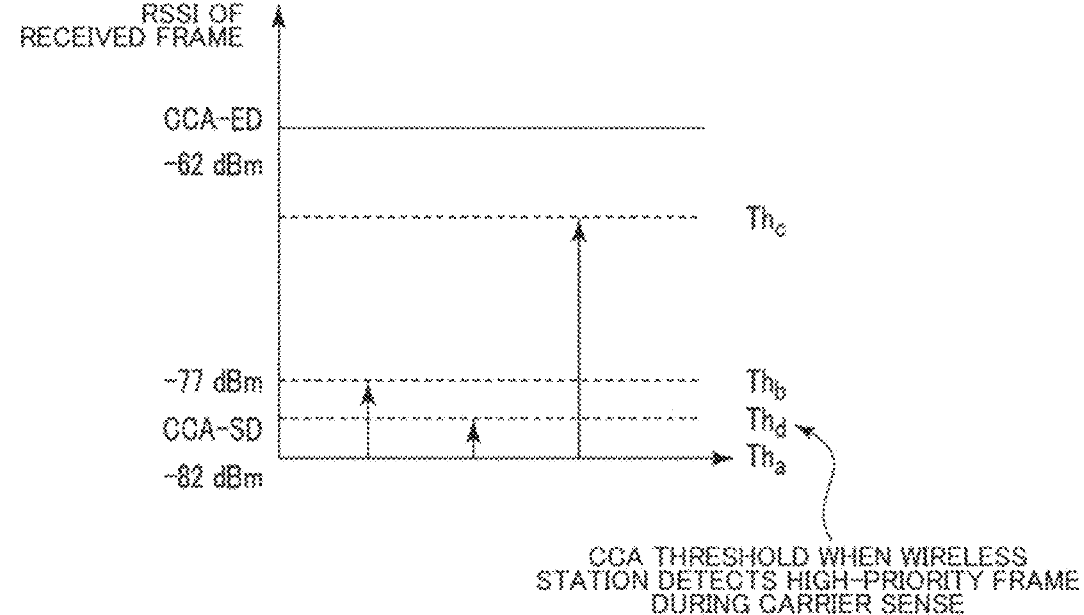
FIG. 15 is a diagram explaining a further example of a method for determining a CCA threshold in the MAC frame processing unit shown in FIG. 5.

In the above-described example, the same CCA threshold ($Th_b$) will be used in both cases, a case where the frame detected by carrier sense is a high-priority frame related to another BSS, and a case where the frame detected by carrier sense is a frame related to another BSS, and the transmission-scheduled frame is a low-priority frame. Different CCA thresholds may be used in these cases. For example, as shown in FIG. 15, the CCA threshold may be set to a value $Th_d$ less than the SR value $Th_b$ when the frame detected by carrier sense is a high-priority frame related to another BSS.

Figure 16:
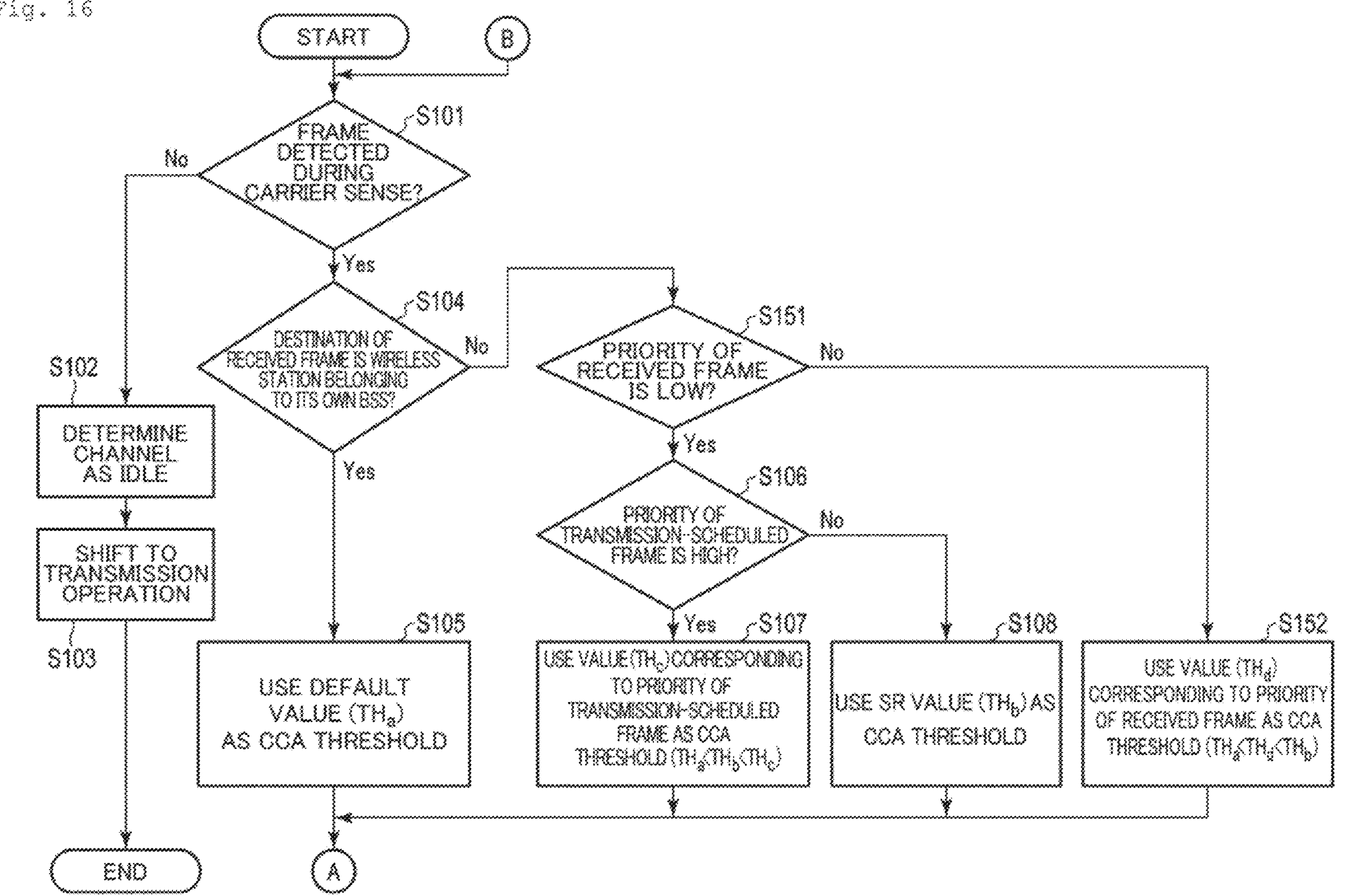
FIG. 16 is a flowchart illustrating a further example of the operation of the access point shown in FIG. 5.

FIG. 16 schematically shows another example of the threshold determination procedure according to the second embodiment. The flow shown in FIG. 16 is a modification of the flow shown in FIG. 13, and the flow shown in FIG. 16 and the flow shown in FIG. 13 are different in the processing when the received frame is a high-priority frame.

In the example shown in FIG. 16, when the priority of the received frame is not low (step S151; No), the processing proceeds to step S152. In step S152, the MAC frame processing unit 122 determines to use the value $Th_d$ corresponding to the priority of the received frame as the CCA threshold. Here, $Th_d$ is larger than $Th_a$ and less than $Th_b$ ($Th_a<Th_d<Th_b$). Specifically, the MAC frame processing unit 122 sets the CCA threshold to value $Th_d$. The processing after the CCA threshold is determined in step S152 is the same as described above with reference to FIG. 10.

In the second embodiment, the CCA threshold is set to a value less than $Th_c$ when a received frame, which is a frame detected by carrier sense, is a high-priority frame related to another BSS. For example, even when the transmission-scheduled frame is a high-priority frame, the CCA threshold is set to the SR value $Th_b$ or a smaller value $Th_d$. This makes it less likely that the channel will be determined to be idle, reducing the chance that high-priority frames related to other BSSs will be interfered. In this way, it is possible to ensure the low latency required for high-priority frames in other BSSs. In this way, the transmission opportunities of high-priority frames related to its own BSS are increased, and high-priority frames related to other BSSs are protected. Therefore, highly reliable wireless communication is provided even in situations where a plurality of BSSs overlaps.

Third Embodiment

The third embodiment describes yet another example of a method for determining a CCA threshold performed by a wireless station. In the third embodiment, descriptions of parts and operations similar to those described in the first embodiment or the second embodiment will be omitted as appropriate.

CSMA/CA implements the RTS/CTS (Request to Send/Clear to Send) scheme to reduce frame collisions due to the hidden terminal problem. In the RTS/CTS system, the transmitting wireless station sends a control frame called RTS to the receiving wireless station before sending a data frame, and the receiving wireless station sends a control frame called CTS when it receives the RTS. RTS and CTS contain a duration field in which the expected period of using the channel is described. Other wireless stations that detect RTS or CTS wait to transmit for the period specified in RTS or CTS. In the IEEE802.11 standard, such a mechanism for suppressing transmission by other wireless stations is called NAV (Network Allocation Vector).

Refer to FIG. 1 again. Here, it is assumed that the access point 10 and the terminal 22 are so far away that the access point 10 cannot detect a frame from the terminal 22. When the access point 12 transmits a frame to the terminal 22, the access point 12 transmits an RTS to the terminal 22, and the terminal 22 transmits a CTS to the access point 12 in response to the RTS. The access point 10 receives the RTS from the access point 12, thereby recognizing that NAV is set for the channel. When the terminal 22 transmits a frame to the access point 12, the terminal 22 transmits RTS to the access point 12, and the access point 12 transmits CTS to the terminal 22 in response to RTS. The access point 10 detects the CTS from the access point 12, thereby recognizing that NAV is set for the channel.

The RTS or CTS preamble contains the BSS color and QoS color. The BSS color of RTS or CTS indicates the BSS to which the wireless station that transmitted the RTS or CTS belongs. The BSS color of RTS or CTS allows the wireless station that received the RTS or CTS to determine whether the NAV was set by a wireless station belonging to its own BSS. The QoS color of RTS or CTS indicates the priority of NAV to be set. The priority of the NAV corresponds to the priority of the data frame that the wireless station that transmitted the RTS is transmitting or intends to transmit.

FIG. 17 schematically shows an example of a threshold determination procedure according to the third embodiment. Steps S504 to S507 shown in FIG. 17 are respectively the same as steps S105 to S108 shown in FIG. 9, so detailed description of these steps of processing will be omitted. The access point 10 performs the flow shown in FIG. 17, but the flow shown in FIG. 17 may be executed by the terminal 22.

In step S501 in FIG. 17, the MAC frame processing unit 122 of the access point 10 receives a transmission queue from the higher layer 102. For example, the LLC processing unit 110 receives data addressed to the terminal 20 from the higher layer 102, generates an LLC packet containing the data, and sends the LLC packet to the data processing unit 121. The data processing unit 121 receives the LLC packet from the LLC processing unit 110, generates a MAC frame including the LLC packet, and sends the MAC frame to the MAC frame processing unit 122. The MAC frame processing unit 122 receives MAC frames from the data processing unit 121 and buffers the MAC frames.

In step S502, the MAC frame processing unit 122 determines whether NAV is set for the channel. For example, determining whether NAV is set may include determining whether RTS or CTS has been received, and determining whether the period described in RTS or CTS has passed. The MAC frame processing unit 122 determines that NAV is not set when the RTS or CTS is not received, or when the RTS or CTS is received and the period described in the RTS or CTS has passed. The MAC frame processing unit 122 determines that NAV is set when the RTS or CTS is received and the period described in RTS or CTS has not passed.

When NAV is not set (step S502; No), the access point 10 executes the flow shown in any one of FIGS. 9, 13, and 16.

When NAV is set (step S502; Yes), the processing proceeds to step S503. In step S503, the MAC frame processing unit 122 determines whether the NAV is set by a wireless station belonging to its own BSS (specifically, the BSS to which the access point 10 belongs). For example, the receiving unit 136 extracts the BSS color from the RTS or CTS preamble by demodulating the RTS or CTS preamble, and the MAC frame processing unit 122 determines whether the BSS color extracted by the receiving unit 136 matches the BSS color of its own BSS. The MAC frame processing unit 122 determines that the NAV is set by a wireless station belonging to its own BSS when the BSS color of the RTS or CTS matches the BSS color of its own BSS, and determines that the NAV is not set by a wireless station belonging to its own BSS when the BSS color of the RTS or CTS does not match the BSS color of its own BSS.

When the NAV is set by the wireless station belonging to its own BSS (step S503; Yes), the processing proceeds to step S504. In step S504, the MAC frame processing unit 122 determines to use the default value $Th_a$ as the CCA threshold.

Figure 18:
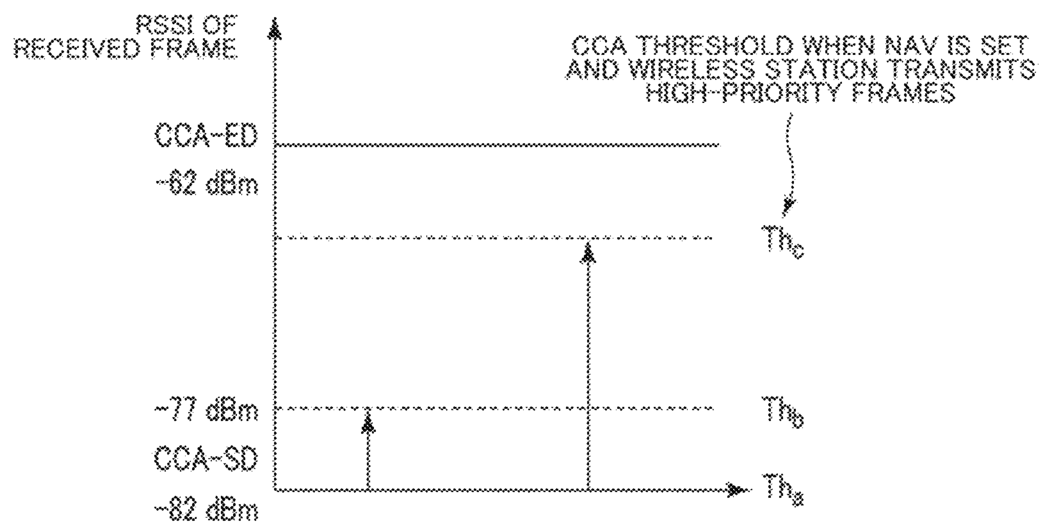
FIG. 18 is a diagram explaining still another example of the method for determining the CCA threshold in the MAC frame processing unit shown in FIG. 5.

When the NAV is not set by the wireless station belonging to its own BSS (step S503; No), the processing proceeds to step S505. In step S505, the MAC frame processing unit 122 determines whether the priority of the transmission-scheduled frame is high. When the priority of the transmission-scheduled frame is not high (step S505; No), in step S507, the MAC frame processing unit 122 determines to use the SR value $Th_b$ as the CCA threshold ($Th_a<Th_b$). When the priority of the transmission-scheduled frame is high (step S505; Yes), the MAC frame processing unit 122 determines to use the value $Th_c$ corresponding to the priority of the transmission-scheduled frame as the CCA threshold in step S506. The value $Th_c$ is larger than the SR value $Th_b$ as shown in FIG. 18.

The processing after the CCA threshold is determined in steps S504, S506, or S507 is the same as described above with reference to FIG. 10.

Figure 19:
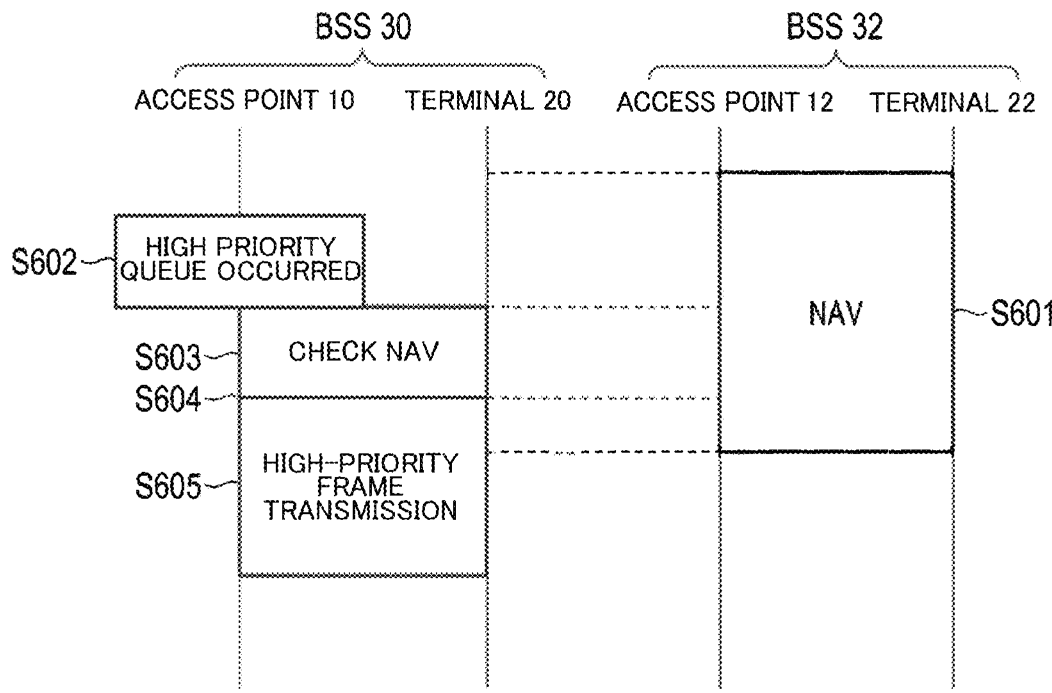
FIG. 19 is a time chart showing still another example of the operation of the communication system shown in FIG. 1.

FIG. 19 schematically shows an example of the operation of the communication system 50 according to the third embodiment. The BSS 30 includes the access point 10 and the terminal 20, and the BSS 32 includes the access point 12 and the terminal 22, as described with reference to FIG. 1. In the example shown in FIG. 19, it is assumed that the access point 10 requests the terminal 20 to transmit a high-priority frame while the access point 12 is transmitting a low-priority frame to the terminal 22. Further, it is assumed that the reception power of frames received by the access point 10 from the access point 12 is between $Th_b$ and $Th_c$.

In step S601 of FIG. 19, the access point 12 transmits an RTS to the terminal 22 on a channel to be used to set NAV for the channel. The terminal 22 transmits a CTS to the access point 12 in response to receiving the RTS. The access point 10 also receives the RTS from the access point 12. The access point 12 receives the CTS from terminal 22 and then starts transmitting low-priority frames to the terminal 22.

In step S602, the access point 10 issues a request to transmit a high-priority frame to the terminal 20, and the access point 10 performs carrier sense based on CSMA/CA. In step S603, the access point 10 determines whether NAV is set. Since the access point 10 receives the RTS from the access point 12 and the period described in the RTS has not passed, the access point 10 determines that NAV is set.

Further, the access point 10 determines whether the wireless station that has set the NAV belongs to its own BSS (BSS 30 in this example). Since the NAV is set by the access point 12 belonging to the BSS 32, the access point 10 determines that the wireless station that has set the NAV does not belong to its own BSS. Subsequently, the access point 10 checks the priority of the transmission-scheduled frame. Since the priority of the transmission-scheduled frame is high, the access point 10 sets the CCA threshold to $Th_c$.

The access point 10 detects a low-priority frame from the access point 12 to the terminal 22 by carrier sense, and compares the reception power of the detected frame with the CCA threshold $Th_c$. The timing at which the low-priority frame from the access point 12 to the terminal 22 is detected may precede the timing at which the CCA threshold is determined. Since the reception power of the detected frame is lower than $Th_c$, the access point 10 determines that the channel is idle (step S604).

In step S605, the access point 10 starts transmitting high-priority frames to the terminal 20.

Figure 20:
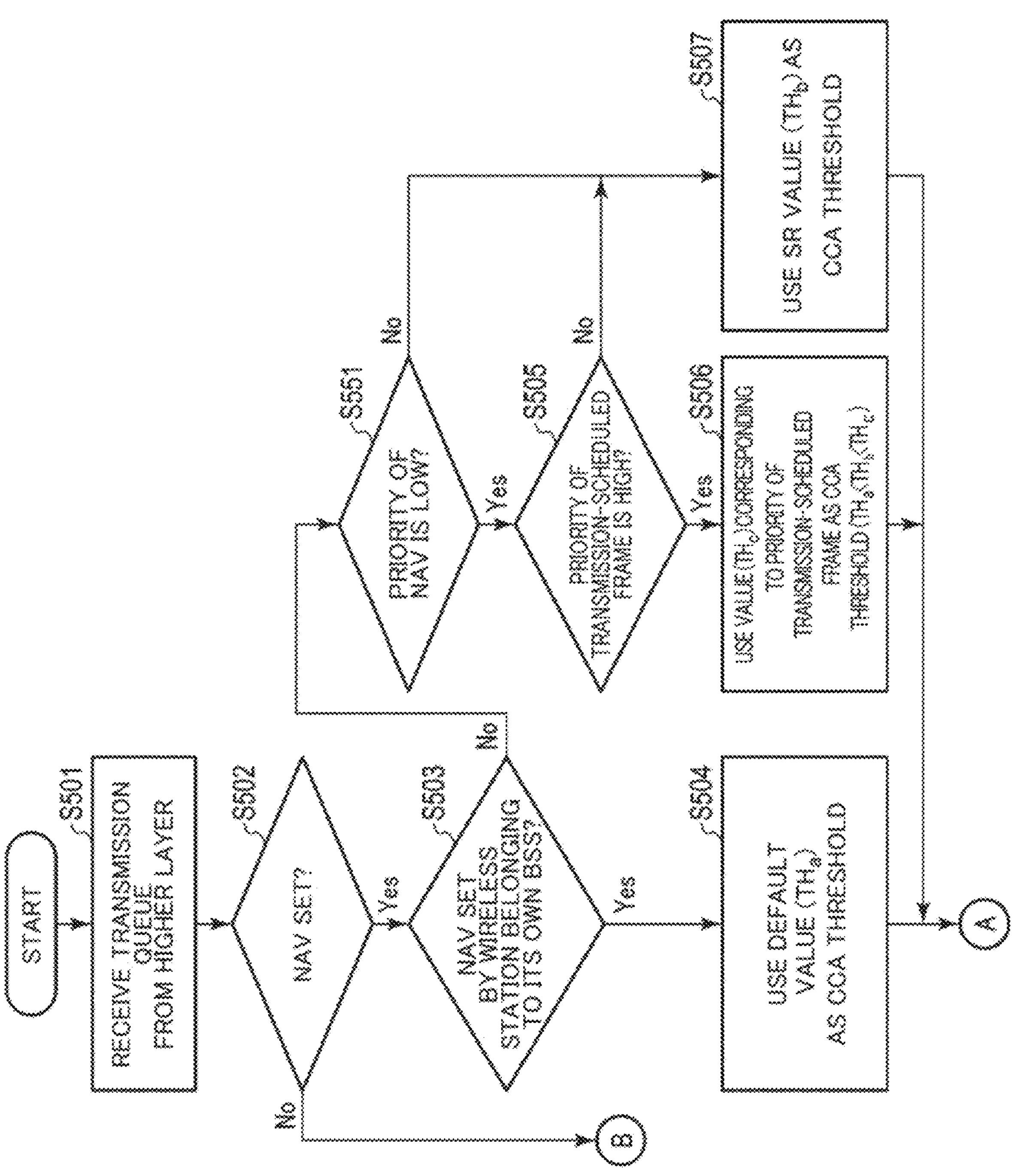
FIG. 20 is a flowchart showing another example of the operation of the access point shown in FIG. 5.

FIG. 20 schematically shows another example of the threshold determination procedure according to the third embodiment. The flow shown in FIG. 20 is obtained by adding step S551 to the flow shown in FIG. 17. Step S551 is added between step S503 and step S505.

In the example shown in FIG. 20, when the NAV is not set by the wireless station belonging to its own BSS (step S503; No), the processing proceeds to step S551. In step S551, the MAC frame processing unit 122 determines whether the priority of NAV is low. For example, the receiving unit 136 of the access point 10 extracts the QoS color from the RTS or CTS preamble by demodulating the RTS or CTS preamble, and the MAC frame processing unit 122 determines whether the priority of NAV is low based on the QoS color extracted by the receiving unit 136.

When the priority of the NAV is low, that is, when the priority of the frame that the wireless station that has set the NAV is transmitting or intends to transmit is low (step S551; Yes), the processing proceeds to step S505. Since the processing after step S505 has been described with reference to FIG. 17, the description will be omitted.

When the priority of the NAV is not low, that is, when the priority of the frame that the wireless station that has set the NAV is transmitting or intends to transmit is high (step S551; No), the processing proceeds to step S507. In step S507, the MAC frame processing unit 122 determines to use the SR value $Th_b$ as the CCA threshold. The processing after the CCA threshold is determined in step S507 is the same as described above with reference to FIG. 10.

FIG. 21 schematically shows a further example of threshold determination procedure according to the third embodiment. The flow shown in FIG. 21 is a modification of the flow shown in FIG. 20, and the flow shown in FIG. 21 and the flow shown in FIG. 20 are different in the processing when the priority of the frame that the wireless station that has set the NAV is transmitting or intends to transmit is high.

In the example shown in FIG. 21, when the priority of NAV is not low (step S551; No), the processing proceeds to step S552. In step S552, the MAC frame processing unit 122 determines to use the value $Th_d$ corresponding to the NAV priority as the CCA threshold. Here, $Th_d$ is larger than $Th_a$ and less than $Th_b$ ($Th_a<Th_d<Th_b$). The processing after the CCA threshold is determined in step S552 is the same as described above with reference to FIG. 10.

In the third embodiment, the wireless station determines the CCA threshold based on whether the NAV is set by the wireless station within its own BSS and the priority of the transmission-scheduled frame. When the NAV is set by a wireless station within its own BSS, the wireless station sets the CCA threshold to the default value $Th_a$. When the NAV is set by a wireless station in another BSS, the wireless station determines the CCA threshold based on the priority of the transmission-scheduled frame.

For example, the CCA threshold is set to a value $Th_b$ larger than the value $Th_a$ when the priority of the transmission-scheduled frame is the first priority level, and the CCA threshold is set to a value $Th_c$ higher than the value $Th_b$ when the priority of the transmission-scheduled frame is the second priority level higher than the first priority level. In this way, the transmission opportunities of high-priority frames increase. In this way, it is possible to ensure the low latency required for high-priority frames. Therefore, highly reliable wireless communication is provided even in situations where a plurality of BSSs overlaps.

When the priority of NAV is high, the CCA threshold may be set to a lower value. For example, even when the transmission-scheduled frame is a high-priority frame, the CCA threshold is set to the SR value $Th_b$ or a smaller value $Th_d$. This makes it less likely that the channel will be determined to be idle, reducing the chance that high-priority frames related to other BSSs will be interfered. In this way, it is possible to ensure the low latency required for high-priority frames in other BSSs. In this way, the transmission opportunities of high-priority frames related to its own BSS are increased, and high-priority frames related to other BSSs are protected. Therefore, highly reliable wireless communication is provided even in situations where a plurality of BSSs overlaps.

In the third embodiment, an example has been described in which the wireless station recognizes that the NAV has been set based on the RTS or CTS. Instead of RTS or CTS, the wireless station may recognize that the NAV has been set based on any frame containing a duration field, such as a data frame.

[Modification]

In the embodiments described above, the QoS color is included in the preamble of the wireless frame. Alternatively, the QoS color may be included in other parts in the wireless frame, such as the MAC header.

The wireless unit of a wireless station (for example, the wireless unit 101 of the access point 10 or the wireless unit 201 of the terminal 20) may be implemented by a discrete component such as a chip. For example, the chip may be integrated into the substrate of the wireless station when the wireless station is manufactured. A wireless apparatus as referred to herein may refer to a wireless station or a discrete component implementing the wireless unit of a wireless station.

Note that the present invention is not limited to the embodiments described above and can variously be modified at an execution stage within a scope not departing from the gist of the present invention. In addition, the embodiments may be combined as appropriate, and in such a case, combined effects can be achieved. Furthermore, the above-described embodiment includes various inventions and various inventions can be extracted by a combination selected from a plurality of disclosed components. For example, when the problem can be solved and the effect can be obtained even when some components are deleted from all the components shown in the embodiment, the configuration in which these components are deleted can be extracted as an invention.

REFERENCE SIGNS LIST

10, 12 Access point
20, 22 Terminal
30, 32 BSS
40 Network
50 Communication system
60 Wireless frame
61 PHY preamble
62 PHY header
63 MPDU
101, 201 Wireless unit
102, 202 Higher layer
110, 210 LLC processing unit
120, 220 MAC processing unit
121, 221 Data processing unit
122, 222 MAC frame processing unit
130, 230 PHY processing unit
131, 231 Transmitting unit
132 PHY header processing unit
133 Wireless signal processing unit
136, 236 Receiving unit
137 Wireless signal processing unit
138 PHY header processing unit
151, 251 CPU
152, 252 ROM
153, 253 RAM
154, 254 Wireless communication module
155 Wired communication module
255 Display
256 Storage

The invention claimed is:

1. A wireless apparatus, comprising:
circuitry configured to:
determine a threshold used for determining a usage state of a frequency channel, the determining the threshold comprising setting the threshold to a first value when a first priority that is a priority of a frame to be transmitted is a first priority level and setting the threshold to a second value higher than the first value when the first priority is a second priority level higher than the first priority level; and
determine the usage state of the frequency channel based on a comparison between reception power of a frame detected on the frequency channel by carrier sense and the threshold, wherein
the detected frame includes identification information that identifies a basic service set (BSS),
the wireless apparatus belongs to a first BSS, and
the determining the threshold comprises:
setting the threshold to a third value less than the first value when the identification information indicates the first BSS,
setting the threshold to the first value when the identification information indicates a second BSS different from the first BSS and the first priority is the first priority level, and
setting the threshold to the second value when the identification information indicates the second BSS and the first priority is the second priority level.

2. The wireless apparatus according to claim 1, wherein the determining the threshold comprises:
setting the threshold to the first value when the identification information indicates the second BSS and a second priority is a third priority level, the second priority being a priority of the detected frame,
setting the threshold to the first value when the identification information indicates the second BSS, the second priority is a fourth priority level lower than the third priority level, and the first priority is the first priority level, and
setting the threshold to the second value when the identification information indicates the second BSS, the second priority is the fourth priority level, and the first priority is the second priority level.

3. The wireless apparatus according to claim 1, wherein the determining the threshold comprises:
setting the threshold to a fourth value larger than the third value and less than the first value when the identification information indicates the second BSS and a second priority is a third priority level, the second priority being a priority of the detected frame,
setting the threshold to the first value when the identification information indicates the second BSS, the second priority is a fourth priority level lower than the third priority level, and the first priority is the first priority level, and
setting the threshold to the second value when the identification information indicates the second BSS, the second priority is the fourth priority level, and the first priority is the second priority level.

4. The wireless apparatus according to claim 2, wherein the circuitry is further configured to set transmission power for transmitting the frame to be transmitted to a first power level when the first priority is the first priority level, and set the transmission power to a second power level higher than the first power level when the first priority is the second priority level.

5. The wireless apparatus according to claim 1, wherein the circuitry is further configured to set transmission power for transmitting the frame to be transmitted to a power level corresponding to the determined threshold.

6. A wireless apparatus, comprising:

circuitry configured to:

determine a threshold used for determining a usage state of a frequency channel, the determining the threshold comprising setting the threshold to a first value when a first priority that is a priority of a frame to be transmitted is a first priority level and setting the threshold to a second value higher than the first value when the first priority is a second priority level higher than the first priority level;

determine the usage state of the frequency channel based on a comparison between reception power of a frame detected on the frequency channel by carrier sense and the threshold; and determine whether a network allocation vector (NAV) is set for the frequency channel and determine whether the NAV is set by a wireless station belonging to a basic service set (BSS) to which the wireless apparatus belongs when the NAV is set, wherein the determining the threshold comprises:

setting the threshold to a third value less than the first value when the NAV is set by a wireless station belonging to the BSS, setting the threshold to the first value when the NAV is not set by a wireless station belonging to the BSS and the first priority is the first priority level, and setting the threshold to the second value when the NAV is not set by a wireless station belonging to the BSS and the first priority is the second priority level.

7. The wireless apparatus according to claim 6, wherein the determining the threshold comprises:

setting the threshold to the first value when the NAV is not set by a wireless station belonging to the BSS, and a third priority is a fifth priority level, the third priority being a priority of the NAV, setting the threshold to the first value when the NAV is not set by a wireless station belonging to the BSS, the third priority is a sixth priority level lower than the fifth priority level, and the first priority is the first priority level, and setting the threshold to the second value when the NAV is not set by a wireless station belonging to the BSS, the third priority is the sixth priority level, and the first priority is the second priority level.

8. The wireless apparatus according to claim 6, wherein the determining the threshold comprises:

setting the threshold to a fourth value larger than the third value and less than the first value when the NAV is not set by a wireless station belonging to the BSS, and a third priority is a fifth priority level, the third priority being a priority of the NAV, setting the threshold to the first value when the NAV is not set by a wireless station belonging to the BSS, the third priority is a sixth priority level lower than the fifth priority level, and the first priority is the first priority level, and setting the threshold to the second value when the NAV is not set by a wireless station belonging to the BSS, the third priority is the sixth priority level, and the first priority is the second priority level.

9. A wireless communication method performed by a wireless apparatus, the wireless communication method comprising:

determining a threshold used for determining a usage state of a frequency channel, wherein the determining the threshold comprises setting the threshold to a first value when a first priority that is a priority of a frame to be transmitted is a first priority level, and setting the threshold to a second value higher than the first value when the first priority is a second priority level higher than the first priority level;

determining the usage state of the frequency channel based on a comparison between reception power of a frame detected on the frequency channel by carrier sense and the threshold; and determining whether a network allocation vector (NAV) is set for the frequency channel and determines whether the NAV is set by a wireless station belonging to a basic service set (BSS) to which the wireless apparatus belongs when the NAV is set, wherein the determining the threshold comprises:

setting the threshold to a third value less than the first value when the NAV is set by a wireless station belonging to the BSS, setting the threshold to the first value when the NAV is not set by a wireless station belonging to the BSS and the first priority is the first priority level, and setting the threshold to the second value when the NAV is not set by a wireless station belonging to the BSS and the first priority is the second priority level.

10. A wireless communication method performed by a wireless apparatus, the wireless communication method comprising:

determining a threshold used for determining a usage state of a frequency channel, wherein the determining the threshold comprises setting the threshold to a first value when a first priority that is a priority of a frame to be transmitted is a first priority level, and setting the threshold to a second value higher than the first value when the first priority is a second priority level higher than the first priority level; and determining the usage state of the frequency channel based on a comparison between reception power of a frame detected on the frequency channel by carrier sense and the threshold, wherein the detected frame includes identification information that identifies a basic service set (BSS), the wireless apparatus belongs to a first BSS, and the determining the threshold comprises:

setting the threshold to a third value less than the first value when the identification information indicates the first BSS, setting the threshold to the first value when the identification information indicates a second BSS different from the first BSS and the first priority is the first priority level, and setting the threshold to the second value when the identification information indicates the second BSS and the first priority is the second priority level.

* * * * *